United States Patent [19]
Boyer

[11] Patent Number: 5,711,636
[45] Date of Patent: Jan. 27, 1998

[54] SYSTEM FOR LINING A PIPE

[75] Inventor: Mark L. Boyer, Houston, Tex.

[73] Assignee: Boyer, Inc., Houston, Tex.

[21] Appl. No.: 780,729

[22] Filed: Jan. 8, 1997

Related U.S. Application Data

[62] Division of Ser. No. 547,472, Oct. 24, 1995, Pat. No. 5,626,442.

[51] Int. Cl.$^6$ ................... F16L 55/18; F16L 1/00
[52] U.S. Cl. .......... 405/154; 15/104.31; 138/97; 156/287; 264/516; 405/156; 405/184
[58] Field of Search ................ 405/154, 156, 405/184, 157, 303, 169–171, 158; 15/104.05, 104.03, 104.63, 104.16, 104.5, 104.31; 156/287, 294; 138/98; 264/40.1, 516

[56] References Cited

U.S. PATENT DOCUMENTS

| | | | |
|---|---|---|---|
| 778,903 | 1/1905 | Schussler | 15/104.31 |
| 2,735,122 | 2/1956 | Pletcher | 15/104.31 |
| 3,058,137 | 10/1962 | Doyle et al. | 15/104.16 X |
| 3,562,836 | 2/1971 | McGhee Frew et al. | 15/104.31 |
| 4,337,096 | 6/1982 | Clifford | 15/104.31 X |
| 4,487,052 | 12/1984 | Yarnell | 15/104.31 X |
| 5,444,887 | 8/1995 | Rufolo | 15/104.31 |

*Primary Examiner*—Dennis L. Taylor
*Attorney, Agent, or Firm*—Fish & Richardson P.C.

[57] ABSTRACT

A rehabilitation system has been developed for cleaning, testing and slip lining pipe particularly sewer lines while in service. The system includes the use of equipment adapted for use on mobile vehicles to increase efficiency and mobility of the system. The cleaning system utilizes a specialized cleaning bucket that can be pulled from excavations and existing manholes. The testing and lining systems also utilize specialized test mandrels and pulling mandrels for the pipe liner that can be used with equipment operating, in part, from existing manholes.

8 Claims, 19 Drawing Sheets

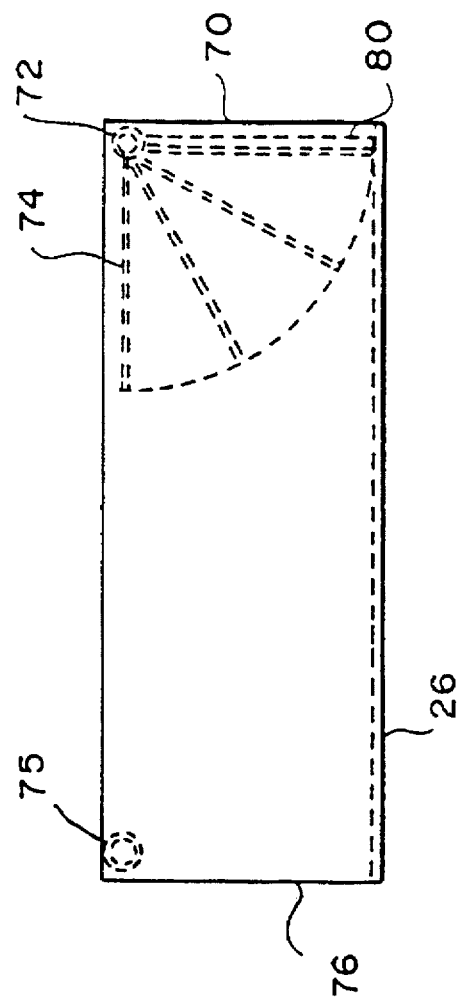
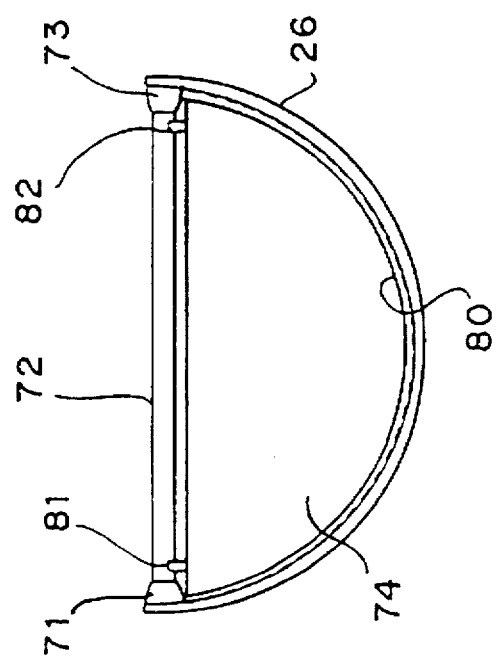
FIG. 9
FIG. 8

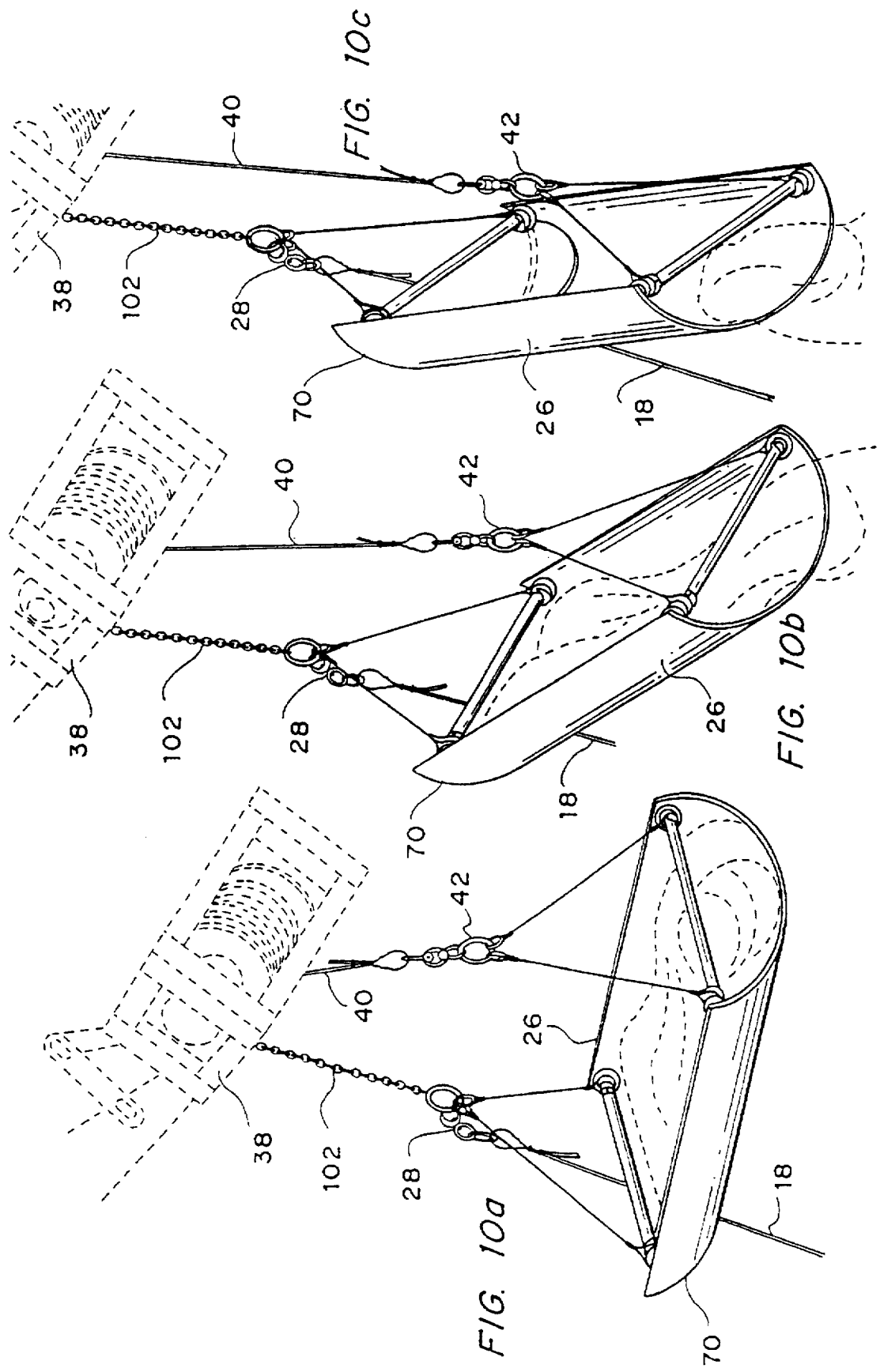

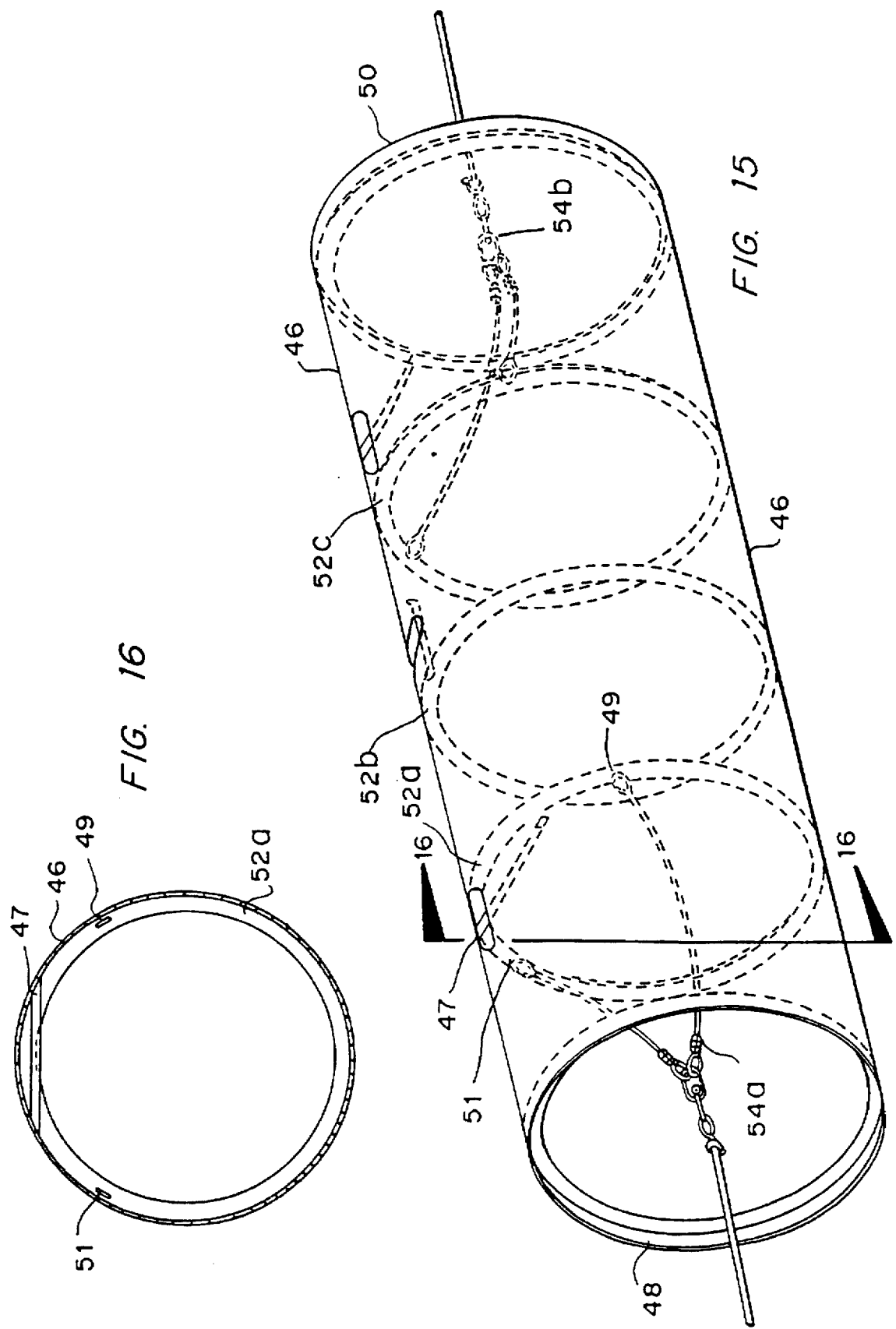

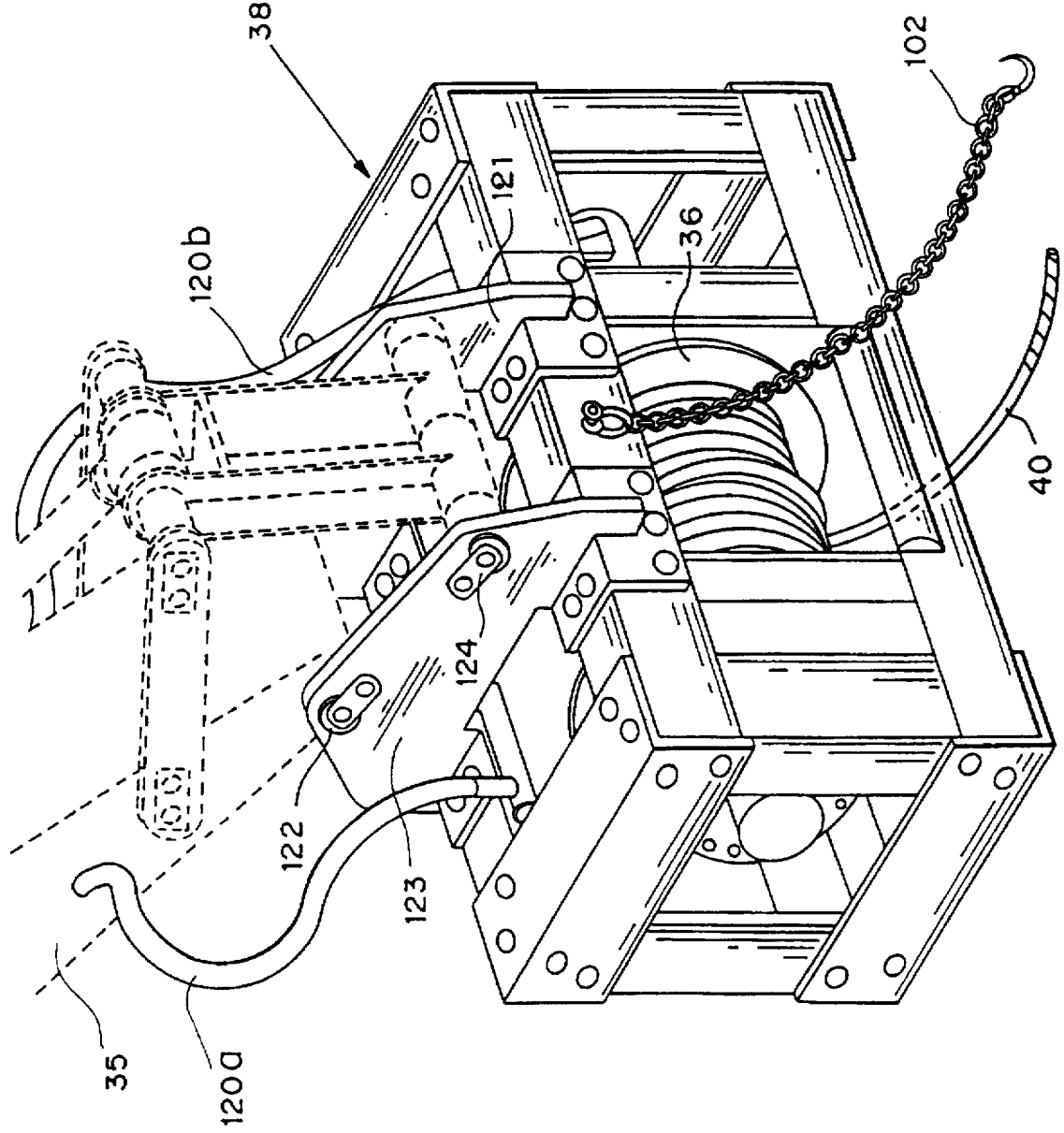

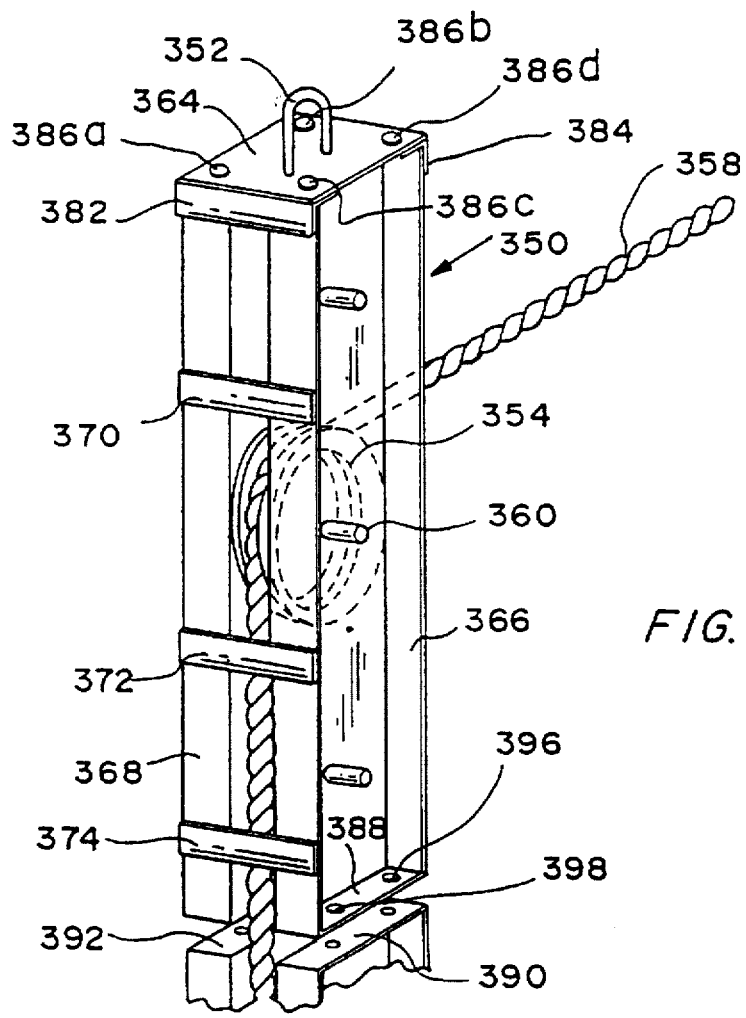
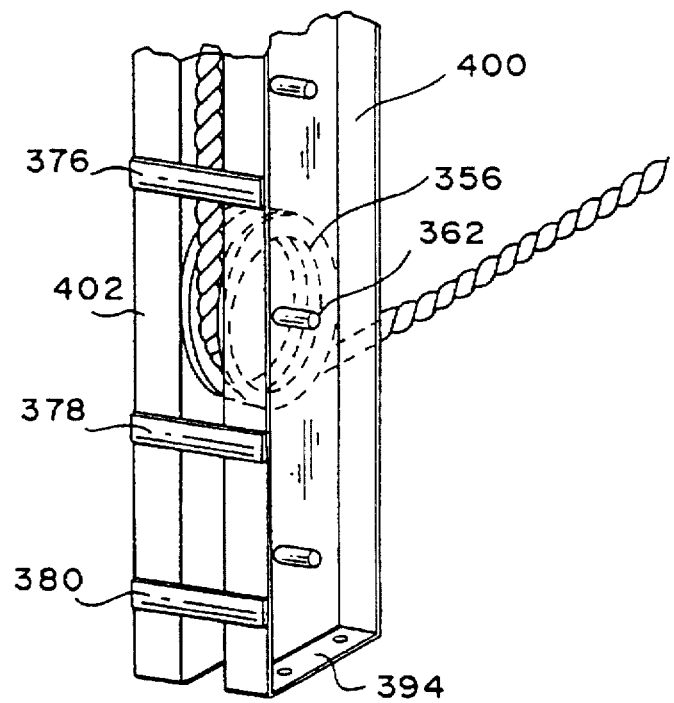
FIG. 19

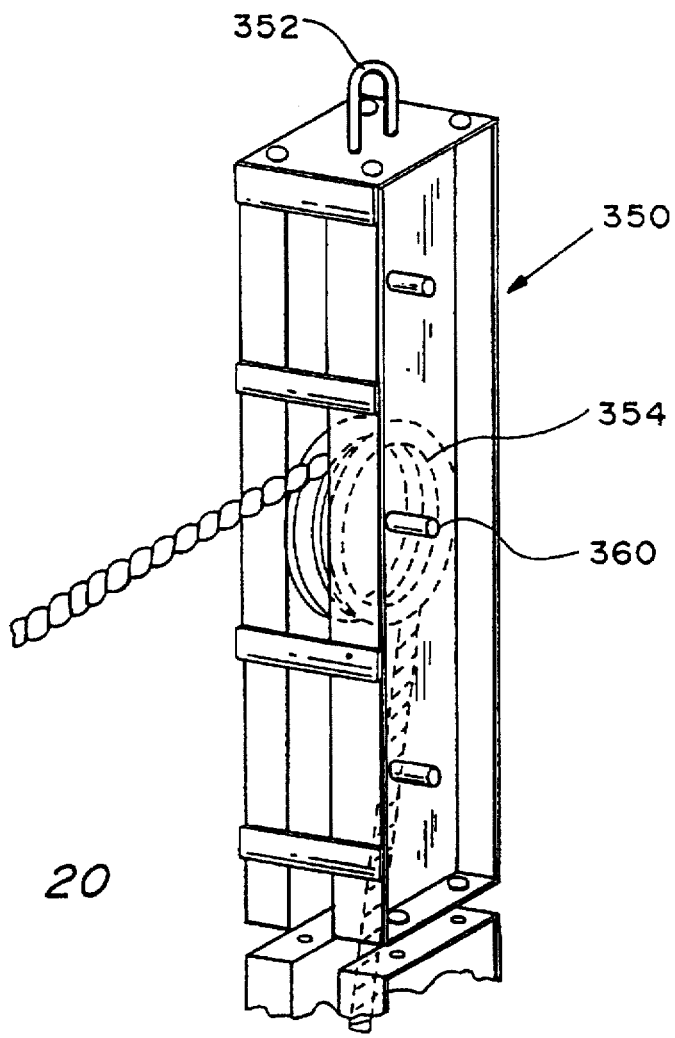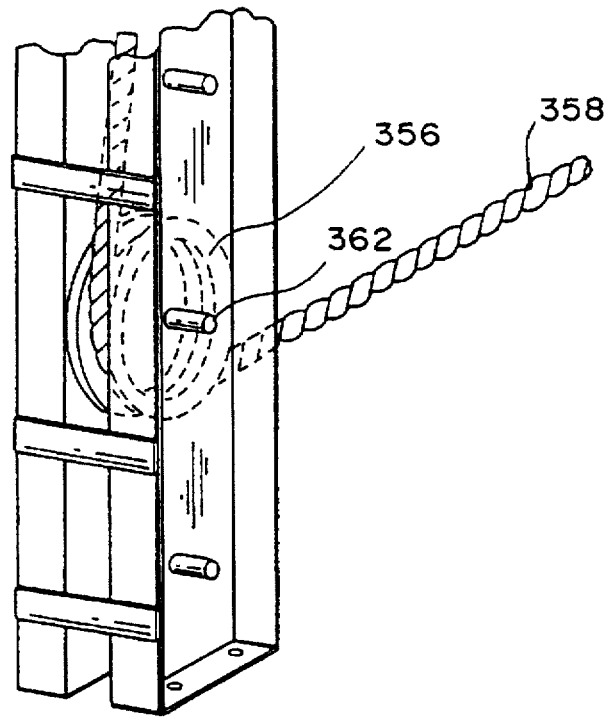
FIG. 20

SYSTEM FOR LINING A PIPE

This is a divisional of application Ser. No. 08/547,472, filed Oct. 24, 1995, now U.S. Pat. No. 5,626,442.

BACKGROUND OF THE INVENTION

Underground service pipes such as sewers which make up the utility infrastructure need replacement or rehabilitation as they age. Through normal service the lines, typically made of concrete, deteriorate or break allowing waste to escape. The buried pipes present access problems. Also, it is desirable to maintain sewer service while the replacement or rehabilitation of the sewer line takes place.

Repairing a service line can involve digging up most or all of the line and replacing the pipe. This is costly, labor intensive and disrupts normal service. Alternative methods such as pipe bursting have been developed which includes breaking up the old pipe underground and following the bursting operation with placement of new pipe in the space provided. Another alternative method involved extracting the old pipe at intervals and replacing it with new pipe by forcing the new pipe into the space provided after the extraction process. The old pipe that was extracted needed to be disposed of adding another economic factor to the method. Some of these methods utilized pipe jacking machines with hydraulic rams or mechanical drivers to push the new pipe in place. In some cases the pipe jacking equipment took up space in the excavation next to the pipe to be burst or extracted. The access thorough existing manholes was insufficient to accommodate the pipe jacking equipment.

The renewal or rehabilitation of the service lines without digging up the line was developed by inserting new pipe or slip lining with materials such as plastic pipe liners inside the old pipe. Rehabilitation of old pipe with a new internal slip lining requires cleaning the existing host pipe of debris that has built up with use. Some methods utilize stationary derricks for the cleaning operations with a drag bucket. The derricks need to be reset after each operation. The bucket size may be limited by the height of the derrick used to hoist the bucket to the surface. The pipe liner is pushed into the host pipe. Often the pressure exerted in the pushing operation is not evenly distributed causing damage to the liners.

The host pipe should be tested after the cleaning process to determine if debris has been removed and the pipe liner can fit. The new joints of liner pipe is then placed in the host pipe. The liner generally has a slightly smaller diameter than the inside of the host pipe.

SUMMARY OF THE INVENTION

This invention is a system for rehabilitating pipe such as sewer lines which renews the existing service lines without disrupting the flow through the lines. In this description the pipe may be described as a sewer line that is in need of rehabilitation. The system retains the host pipe and therefore the value of the structure in place while not creating additional waste disposal concerns with the extracted pipe. The system utilizes mobile equipment such as conventional excavators that are fitted with winches on the attachment points for custom tools, the winch manipulates and lifts the buckets for the cleaning operation, and the test mandrel and the pipe liner in the slip lining renewal operation.

The system for cleaning the sewer line is often needed prior to the slip lining process because of the debris built up in the sewer line after years of use or rapid deposition of debris because of adverse environment conditions. The present invention utilizes equipment that can be used for both the cleaning and relining process as well as testing the host pipe prior to relining to confirm that the interior of the host pipe is clear and the liner pipe will be received without damage.

In the rehabilitating system of the invention the length of host pipe is accessed on both ends. Manholes already present can be used as access on at least one end of the host pipe and are generally large enough for one end of the operation. A larger excavation to accept the new pipe liner and a test mandrel is required on the other end of the host pipe from the manhole.

In an embodiment of the system the host pipe is accessed through a shaft that can be an existing manhole. A down hole boom is inserted into the shaft. The down hole boom has a winch mounted and a guide roller mounted thereon. The guide roller is adjustably mounted so that when the down hole boom is placed in the shaft the guide roller is positioned to guide the cable from the winch over the roller into the host pipe. The down hole boom generally extends above the surface of the shaft. The winch is preferably mounted on the part of the boom above the surface. In one embodiment the winch on the down hole boom is also mounted to a mobile vehicle such as an excavator.

A selected length from the access shaft another access area to the host pipe is provided that is large enough to accommodate other equipment necessary for the rehabilitation process such as lengths of the new pipe liner. A host vehicle with a movable boom such as an excavator is positioned at the surface of the second access area. Various embodiments of the system use conventional excavators which are easily transported from site to site. A second winch is mounted on the end of the boom. The boom operator can manipulate the boom and winch so that the winch can be moved from above the surface into the access area and to the mouth of the host pipe. In the preferred embodiment, a housing is mounted to the end of the boom and surrounds the winch. The housing protects the winch, but allows for free movement of the cable spooled on the winch. The winch housing is attached to the boom on the custom attachment points used for other types of tools. The cables from both winches are capable of disengageable attachment to equipment used to rehabilitate the host pipe.

One of the pieces of equipment used to rehabilitate the host pipe which is part of the system is a cleaning bucket. The semicircular cleaning bucket is sized to be received in the host pipe. The cleaning bucket has a leading edge with a flap door that is generally semicircular and hinged to the top of one end of the bucket. The flap door swings to the inside of the bucket from the closed to open position. An open end is opposite to the flap door on the cleaning bucket. The cleaning bucket has points of attachment for to the cables such as yokes.

An additional piece of equipment of the system is a test mandrel used to determine if there are any obstructions in the host pipe prior to lining. The test mandrel is a cylindrical member with beveled edges on both ends. A plurality of internal ribs and internal pulling yokes are disposed inside the cylindrical member.

Another feature of the system is a pulling mandrel designed to distribute the pulling forces in an even manner around the pipe liner while it is pulled by the cable on a winch and pulled inside the host pipe. The mandrel also provides for areas of flow therethrough so the sewer remains in service during the slip lining operation. The pulling mandrel is a circular member with a diameter sized to be received into the host pipe and to contact the circumference of a liner for the host pipe. A plurality of spokes extend from the circular member and converge to the middle of the circular member to a central hub. The hub has an opening of sufficient size to accompany a cable passing therethrough.

The invention also includes methods for using the system in rehabilitating the sewer lines. The cleaning method starts with the selected length of host pipe described above that has at least two access points with one access that can be a manhole. The cleaning bucket described above is attached to a cable. In an embodiment one cable is strung between the two winches with the cleaning bucket attached. In a preferred embodiment of the system the cable from the winch on the down hole boom attached to a yoke on the leading edge of the cleaning bucket and the cable on the movable boom is attached to the open end of the cleaning bucket.

The cleaning bucket is lowered into the access area serviced by the winch on the movable mount. The cleaning bucket is pulled by spooling the winch on the down hole boom through the host pipe with the leading edge first so that the flap door is open. The drag is reversed by spooling the winch on the movable mount so that when the cleaning bucket is pulled in the opposite direction the flap door closes and traps debris. The cleaning bucket with the debris is hoisted to the surface by spooling the winch on the movable mount and raising the mount. The debris is discharged from the bucket. The processes is repeated until the host pipe is cleaned.

Generally the next method used in sewer rehabilitation that utilizes the system is a testing procedure to determine that the pipe liner will fit suitably in the host pipe. This operation involves pulling a test mandrel which is a tubular member with the approximate diameter and length of the pipe liner through the host pipe. In the preferred system, the test mandrel has beveled edges on each end and performs a final sweep of the host pipe loosening and removing any remaining solids or mineral deposition on the inside of the host pipe. Also, the internal ribbing provide weirs for collection of the debris. The method for using the system for testing includes lowering the test mandrel in the access area next to the host pipe. The cables from both winches are attached to the internal yokes inside the test mandrel. The winch on the down hole boom is spooled so that the mandrel travels through the host pipe toward the access shaft. The travel is then reversed by spooling the winch on the movable mount. The ease of travel by the mandrel through the host pipe is indicative of an obstruction or lack thereof.

The host pipe is lined after the cleaning and testing process. However lining might be necessary if there has been some structural damage to the integrity of the sewer pipe and a cleaning process is not necessary. At one access area the excavation is large enough to accommodate a length of pipe liner. The same system is used in the cleaning and testing operation may be used in relining the host pipe. A cable on the winch on the down hole boom is passed through the length of the host pipe. The cable is then passed through a length of pipe liner and the pulling mandrel that is placed adjacent to the pipe liner that has also been lowered into the access area.

The cable is secured to the pulling mandrel so that when the cable on the down hole boom is spooled it pulls the pipe liner into the host pipe. The cable is spooled approximately the length of the pipe liner section. The end of the cable is released from the pulling mandrel. Another section of pipe liner is placed in the access area at trailing end of the first pipe liner section and the pulling mandrel is placed at the end of the second pipe liner section. The cable is spooled and the next section of the pipe liner is pulled into the host pipe. This process is repeated until the host pipe length is lined.

Another method of the invention is a method for rehabilitating a host pipe that is adaptable to smaller pipe and can be performed while the sewer is in service. The alternate method is suitable for remote or difficult to access areas. This alternate method uses basically the same equipment for all the rehabilitation work to clean and line the pipe. The alternate method involves selecting the host pipe and accessing two ends through shafts that can be existing manholes. An excavation intermediate to the two shafts is dug and a portion of the host pipe is removed. Two down hole booms are inserted into the access shafts and extend above the surface. Winches are positioned adjacent to the down hole booms. The cable spooled on the winches are placed over guide rollers on the down hole booms so that the winches can pull the cable down the access shaft into the host pipe to the intermediate access area. The alternative method includes down hole booms and winches that can be skid mounted or mobile mounted.

A hoist device with at least one cable is placed at the surface of the intermediate access area to the host pipe. A cleaning bucket as described above is lowered into the intermediate access area by the hoist and attached to one of the cables associated with the winch and down hole boom. Cables from the winches on the down hole booms are attached to either end of the cleaning bucket. As the cleaning bucket is pulled through the host pipe and reversed the debris is trapped. The cable on the hoist is attached to the cleaning bucket. The cleaning bucket is withdrawn from the intermediate access area and the collected debris is discharged at the surface. With two access shafts to the host pipe, the cleaning bucket can used on both sections of the host pipe extending from the intermediate access area.

The testing method utilizes the same equipment. A test mandrel is lowered into the intermediate access area by the hoist. Cables from the two winches are attached to either end of the test mandrel and it is pulled through the host pipe to determine if any obstruction exists.

The same equipment is used to line the host pipe. The hoist introduces pipe liner into the intermediate excavation area. Both sections of host pipe that extend from the intermediate access area are lined. A cable extended from one of the winches into the intermediate access area is passed through a section of pipe liner and then secured to a pulling mandrel. The cable is spooled approximately the length of the pipe liner. The pulling mandrel is removed and another section of pipe liner is introduced into the intermediate access area by the hoist and aligned to abut with the first section pulled into the host pipe. The cable is released by the winch and pulled through the second section of pipe liner and secured to the pulling mandrel. The winch spools the cable pulling the first and second sections of pipe liner into the host pipe. The process is repeated using both winches until the host pipe extending from the intermediate area is lined.

BRIEF DESCRIPTION OF THE DRAWINGS

FIG. 8 is an end view of the cleaning bucket with the flap door closed.

FIG. 9 is a side view of the cleaning bucket showing the swing of the flap door.

FIGS. 10a, 10b, and 10c are perspective views of the cleaning bucket and winch during the discharge process.

FIG. 15 is a partially perspective view of the test mandrel that also shows the internal ribs and yokes by the dotted lines.

FIG. 16 is a cross-section at line 16 of FIG. 15.

FIG. 17 is a perspective view of the winch and housing.

FIG. 19 is a down hole boom with two adjustable guide rollers for use in an alternative embodiment of this system.

FIG. 20 is an alternative embodiment of a down hole boom with two adjustable guide rollers for use in an alternative embodiment of this system.

DETAILED DESCRIPTION OF THE INVENTION

Figure 1:
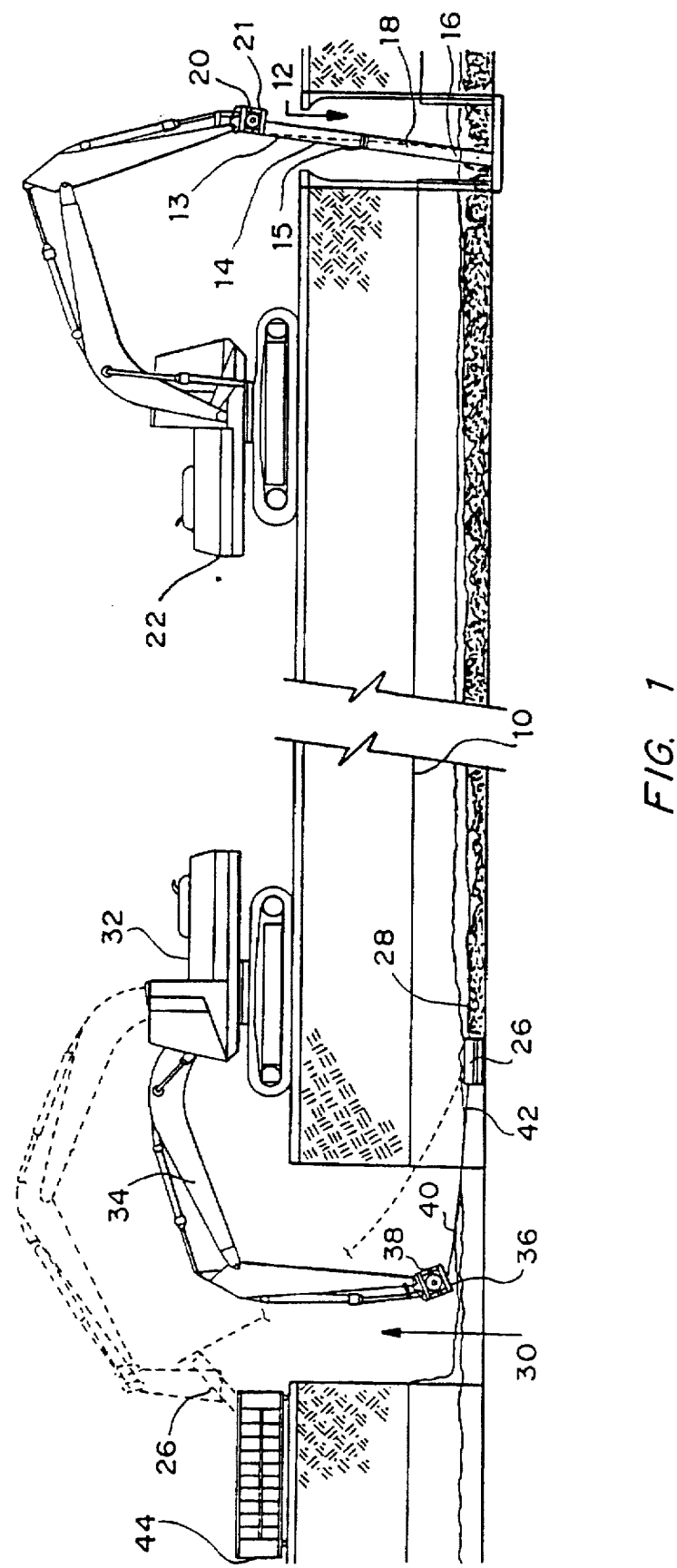
FIG. 1 is a schematic depiction of the sewer rehabilitation system during the cleaning process.

A system for rehabilitating sewer lines is shown in FIG. 1 during cleaning of a host pipe. As shown in FIG. 1, the host pipe 10 has been accessed at one end of the selected length for rehabilitation by access shaft 12 which can be an existing manhole or other existing access shaft to the sewer line which is wide enough to accommodate down hole boom 14. Down hole boom 14, as shown in FIG. 1, extends from above the surface of the manhole entrance to the bottom of the manhole and rests on the bottom of the manhole. In the preferred embodiment down hole boom has a guide roller 16 at the end of the down hole boom close to the mouth of the host pipe. The guide roller is adjustable along the length of the boom so that cable 18 from winch 20 can extend into the access shaft along the down hole boom around guide roller 16 and into the host pipe. Depending on the diameter of the host pipe, guide roller 16 can be adjusted on the down hole roller so that the cable 18 extends preferably to the host pipe. Auxiliary guide roller 13 mounted on the down hole boom 14 is also shown. The extension of the down hole boom may be adjusted by attaching different lengths together. A joinder point 15 is shown on the down hole boom 14 where two lengths are fastened together. Winch 20 is mounted on the part of the down hole boom extending above the manhole. However the winch could be located beneath the surface in the manhole. Winch 20 is also mounted to a host vehicle 22 which in FIG. 1 is shown as a conventional excavator. However, down hole boom 14 and winch 20 may be supported at the surface above access shaft 12 by a stationary support. FIG. 1 illustrates the use of a host vehicle 22 to illustrate the transportability of the system.

The winch 20 spools and pulls cable 18. The winch may be mechanically driven, but in the preferred system the winch mechanism is hydraulically driven and operated. Cable 18, threaded on winch 20, extends the length of down hole boom 14 may be guided on the down hole boom by additional guide rollers, such as auxiliary guide roller 13 then around guide roller 16 at the mouth of host pipe 10 and into the host pipe. In FIG. 1 the cleaning bucket 26 is attached to cable 18 at yoke 28.

A second access area generally indicated by reference numeral 30 is excavated a selected length from access shaft 12. The second access area extends from the ground surface and a portion of host pipe 10 is removed. As shown in FIG. 1 a system of this invention can be used while the sewer is flowing and the host pipe was removed down to the spring line to contain the sewer effluent. Adjacent to the second access area is host vehicle 32 which is equipped with a movable boom mechanism. Host vehicle 32 is a movable mount and can be a conventional excavator. On the end of the boom a second winch 36 is attached to point of attachment for a backhoe. The winch 36 is surrounded by housing 38 that allows for free movement of cable 40 into the access area host pipe. In FIG. 1 cable 40 is shown attached to yoke 42 on cleaning bucket 26. Both cables 18 and 40 are used to engage various pieces of equipment during the rehabilitation of the host pipe.

As shown in FIG. 1 the host vehicle 32 stabilizes the boom and the winch 36 so that there is freedom of movement from the mouth of the host pipe to above ground. Boom 34 in association with winch 36 can introduce and withdraw equipment used in the rehabilitation process in and out of the second access area.

Figure 7:
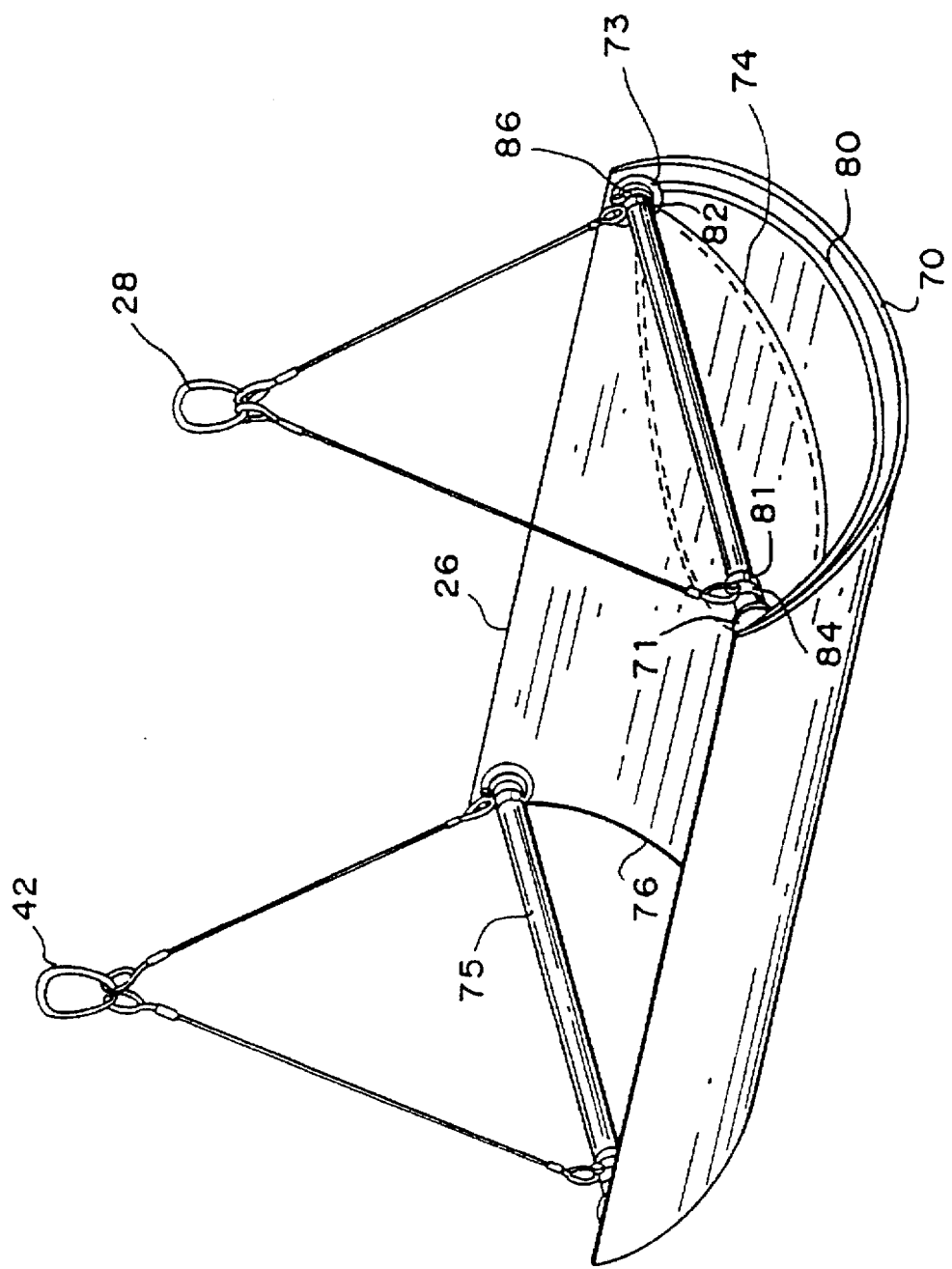
FIG. 7 is a perspective view of a cleaning bucket.

FIG. 1 is a schematic drawing showing the cleaning process. Cleaning bucket 26 is shown in more detail in FIGS. 7, 8 and 9. Referring to FIG. 7 cleaning bucket 26 is generally semi-circular with a diameter size to be received into the host pipe. The cleaning bucket 26 has a leading edge 70 with a flap door 74 hinged to the top end of one end of the bucket on a rotating hinge rod 72 that allows the flap door to swing inside the bucket from a closed to open position. A built up door stop 80 in the form of a semicircular edge extending from leading edge 70 provides a means for closing flap door 74. Any other closure means can be used. The hinge rod 72 is secured in bushings 71 and 73 that allow for swing of the hinge rod. Other retaining means that allow the hinge rod to swing are also suitable. The bucket is open at end 76 opposite to the flap door 74. Yokes 28 and 42 as shown in FIG. 1 are also shown in FIG. 7 as attachment means to engage the cables. Yoke rod 75 across the top of the bucket is provided at open end 76. FIG. 8 is an end view of the cleaning bucket 26 with the flap door 74 in the closed position. In FIG. 8 yoke pins 81 and 82 are shown which are provided on hinge 72 to hold yoke rings 84 and 86 (shown on FIG. 7) in place. Similar yoke rings and pins may be provided on yoke rode 75. Any means for holding yoke rings in place can be utilized. FIG. 9 shows the flap door 74 movement on hinge rod 72.

In FIG. 1 the cleaning bucket is being drug through the host pipe and the yokes 28 and 42 are pulled outwardly from either end of the cleaning bucket. In the cleaning process the cleaning bucket 26 is lowered into the second access area by boom 34 and winch 38. The cable 18 is attached to yoke 28 and cable 40 is attached to yoke 42. Winch 20 spools cable 18. Cleaning bucket 26 travels through the debris in host pipe 10 with the leading edge 70 being dragged first and flap door 74 pivots to the inside of the cleaning bucket. FIG. 9 shows the swing of flap door 74 that occurs during the spooling of cable 18. The drag on the cleaning bucket is reversed by spooling cable 40 on winch 36. Flap door 74 closes as it collects debris and the cleaning bucket is withdrawn to the surface. As the cleaning bucket is drawn to the surface, cable 18 is slackened to allow for withdrawal of the cleaning bucket without need to detach cable 18.

In FIG. 1 there is a schematic depiction of discharging debris the cleaning bucket into collection bin 44 at the surface near the access area. FIGS. 10a, 10b, and 10c are details of the discharge operation of the cleaning bucket. In the current embodiment fixed cable 102 is attached to the winch housing 38. Cable 102 is a fixed chain that is not attached to the winch or any other spooling mechanism. The chain is attached to yoke 28 by personnel on the site. Cable 40 is spooled to hold the cleaning bucket 26 in a relatively horizontal position so that the debris does not spill out the open end. The boom operator positions boom 34 with the winch and the cleaning bucket over collection bin 44 and spools out cable 40 allowing the bucket to tip and discharge the debris as shown in the details of FIGS. 10b and 10c. The fixed cable 102 holds the end of the cleaning bucket with the flap door in a relatively stationary position. When the leading edge 70 of the bucket is reversed for instance when the cleaning operation is in the opposite direction, the fixed chain 102 can be positioned on the other side of the winch housing.

After the discharge from the cleaning bucket it is reintroduced in the access area by boom 34 and into the mouth of the host pipe. The cable 18 is spooled up and the process is repeated until the debris is cleared from the host pipe.

Figure 18:
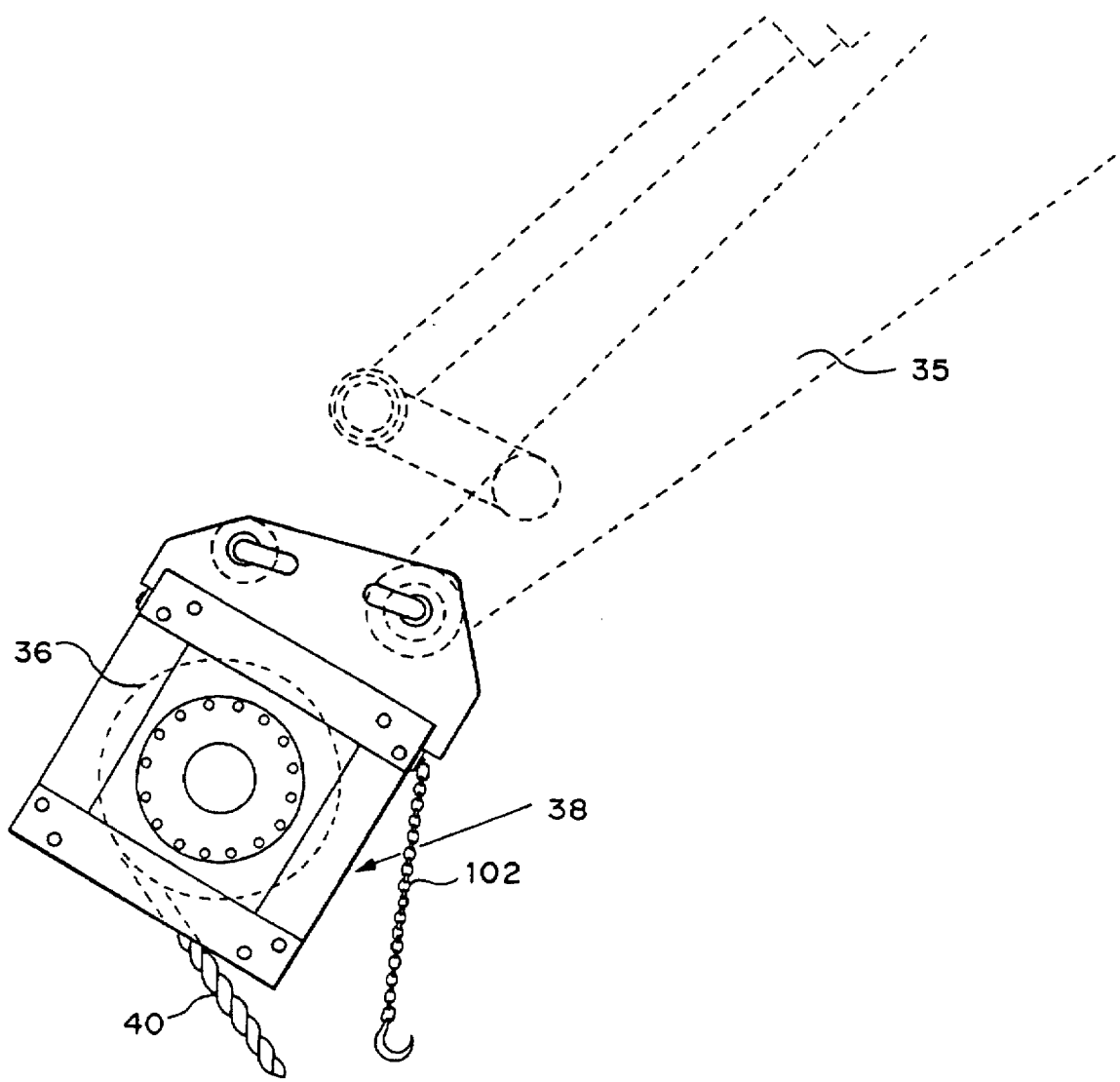
FIG. 18 is a side view of the winch and housing.

FIG. 17 is a detailed perspective view of the housing 38 surrounding winch 36. The fixed cable 102 used to hold the cleaning bucket during discharge is also shown. Lines 120a and 120b supply hydraulic fluid to the winch are also shown. The winch housing surrounding the cable has an open bottom to allow for free movement of cable 40. In the preferred embodiment the winch housing is built of strong metal such as heavy steel that can bear the weight of an excavator. The bottom of the winch housing is relatively flat. The winch housing is constructed with attachment plates 121 and 123. The attachment plates are provided with attachment points which are shown as attachment pins at reference numerals 122 and 124 for plate 123 to the stick 35 of boom. The winch housing attachment pins are spaced to correspond to custom tool attachments designed for conventional excavators so that in the preferred embodiment the winch can be used on an excavator just as other custom attachments are used. FIG. 18 is a side view of winch housing 38 and the attachment to the stick portion 35 of the boom where the other custom attachments or tools are typically attached.

Figure 21:
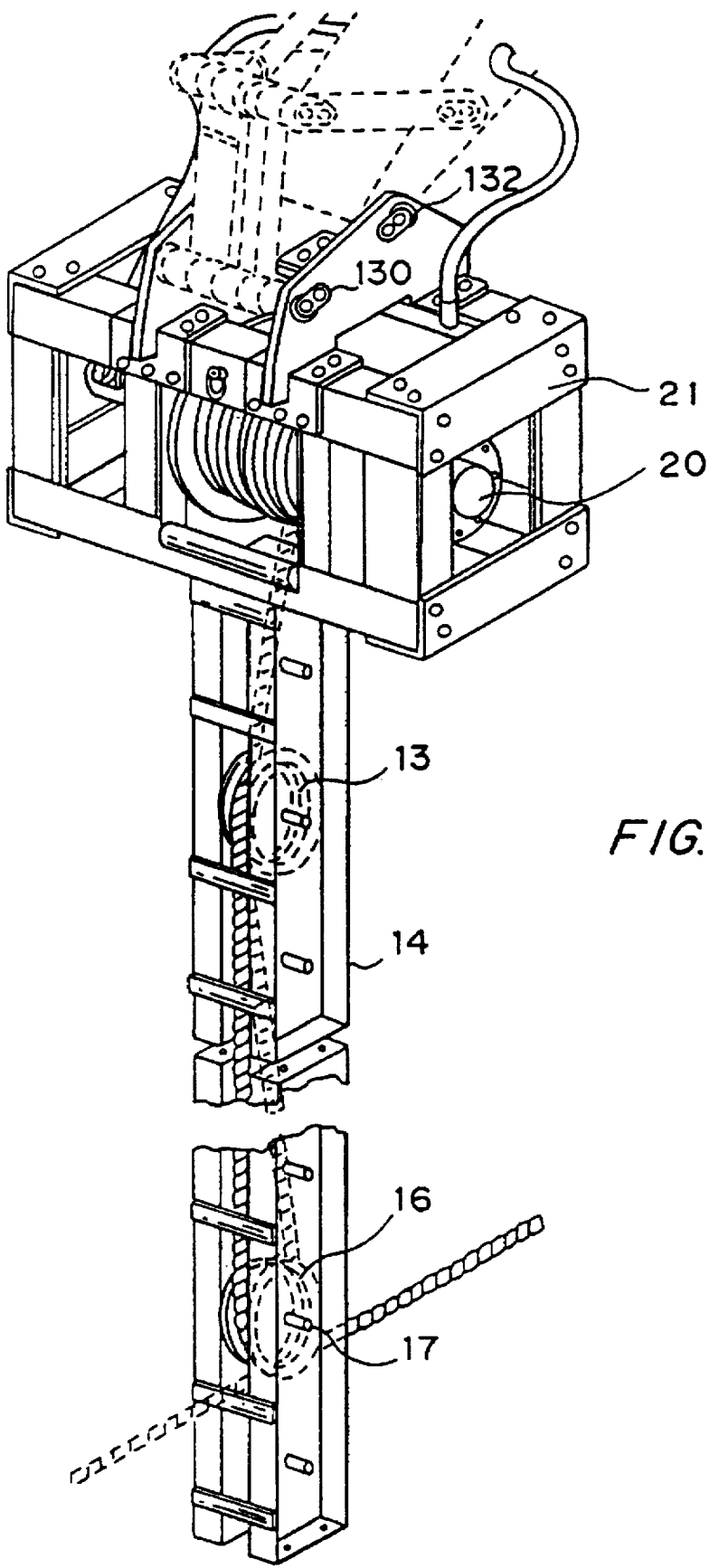
FIG. 21 is a perspective view of a down hole boom and winch associated with a movable mount.

FIG. 21 is a detail of an embodiment with the down hole boom 14 shown attached to winch housing 21. The winch housing is constructed in the same fashion so that it attaches to end of a boom of an excavator where a bucket or other tool is generally attached. The down hole boom is configured with back to back C shaped beams spaced apart with guide rollers positioned in between the C-beams. FIG. 21 shows a down hole boom with guide roller 16 and auxiliary guide roller 13. Both guide rollers are adjustable by using pins inserted into openings along the down hole boom. In the case of guide roller 16, pin 17 is inserted through openings in C-beams and held in place by a pin retainer such as a clip, bolt and washer or other means known to those in the art. The down hole boom has numerous pins that are positioned in slots along the length of the down hole boom so that the guide rollers can be positioned as needed. As shown in FIG. 21, guide roller 16 has been positioned so that the cable is positioned to be received in the host pipe (not shown). To facilitate smooth driving of the cable additional guide rollers such as auxiliary guide roller 13 can be included along the length of the down hole boom 14. As shown in FIG. 21 the cable can be fed on either side of guide roller 16 depending on which direction cable is driven into the host pipe.

Figure 2:
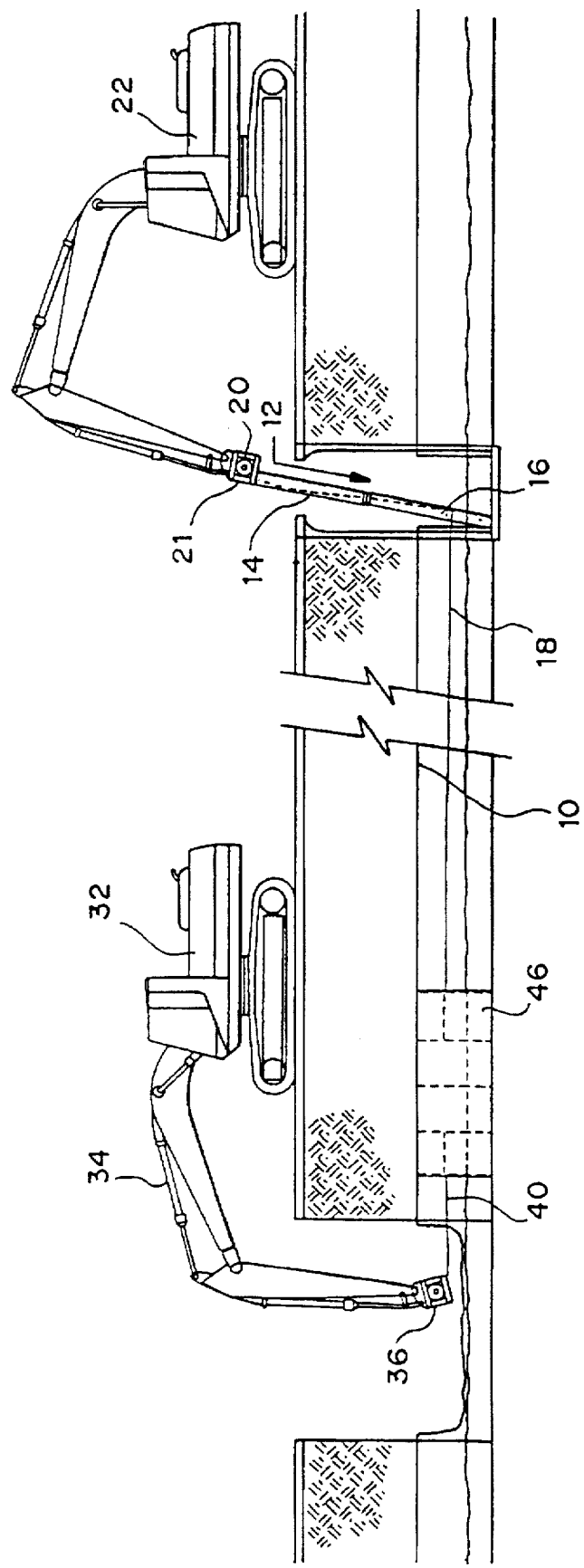
FIG. 2 is a schematic depiction of the sewer rehabilitation system during the testing process.

FIG. 2 is a schematic of the system figured for testing the host pipe with test mandrel 46 to determine if there is any additional debris or obstruction in the host pipe prior to lining. The same equipment is used including the down hole boom 14 with associated guide roller 16 and winch 20 which spools out and pulls cable 18. The second host vehicle 32 and associated boom 34 with winch 36 surrounded by housing 38 and cable 40 are used in the testing process. Winch 20 is shown in housing 21 and mounted to the boom of host vehicle 22. The host vehicle has travelled to the other side of the access shaft. The down hole boom 14 is shown braced against the bottom of the host pipe.

Test mandrel 46 is lowered into the access area by the boom on host vehicle 32. The test mandrel is a cylindrical member sized approximately the same diameter as the pipe liner. The test mandrel should be of sufficient length to test joint deflection in the host pipe to avoid damage to the new liner. Cables 40 and 18 are attached to the test mandrel 46 so that upon spooling the appropriate cable the mandrel may travel through the host pipe if it is clean and free of obstruction. As shown in FIG. 2, winch 20 will spool cable 18 so that the test mandrel travels to the end of the host pipe 10 at the shaft or manhole 12. Then winch 36 will spool cable 40 and pull the test mandrel back to the access area. Winch 36 is positioned so that the cable 40 can be driven into the central part of the mouth of the host pipe as shown in FIG. 2.

Detailed drawings of the test mandrel of the system are shown in FIGS. 15 and 16. Test mandrel 46 is a generally cylindrical member and has circular bevelled edges 48 and 50. FIG. 16 is a cross-section of test mandrel 46. FIG. 15 shows the internal component of the test mandrel, including ribs 52a, 52b and 52c. The ribs provide reinforcement for the test mandrel. Also, beveled edges 48 and 50 provide a final sweeping of the cleaned host pipe and assist in loosening residual deposits such as mineral deposits and other deposited debris. The ribs 52a, 52b and 52c act as weirs to collect the residual deposits inside the test mandrel in addition to providing structural support. The test mandrel of this invention also has internal yokes 54a and 54b. Yoke 54a is attached to rib 52a at slots 49 and 51. Yoke 54b is similarly situated on the other end of the test mandrel. The yokes can be made of any type of material and is shown as two cables attached to the rib with a central joinder for the cable attachment, however any other type of yoke attachment to the test mandrel could be used. The test mandrel has lifting means one of which is illustrated in FIGS. 15 and 16 as lift pin 47 which is fixed inside the test mandrel under a slot. The lift pin 47 provides an attachment means for a cable to lift the test mandrel. Other lift pins may be provided as shown in FIG. 15.

Figure 3:
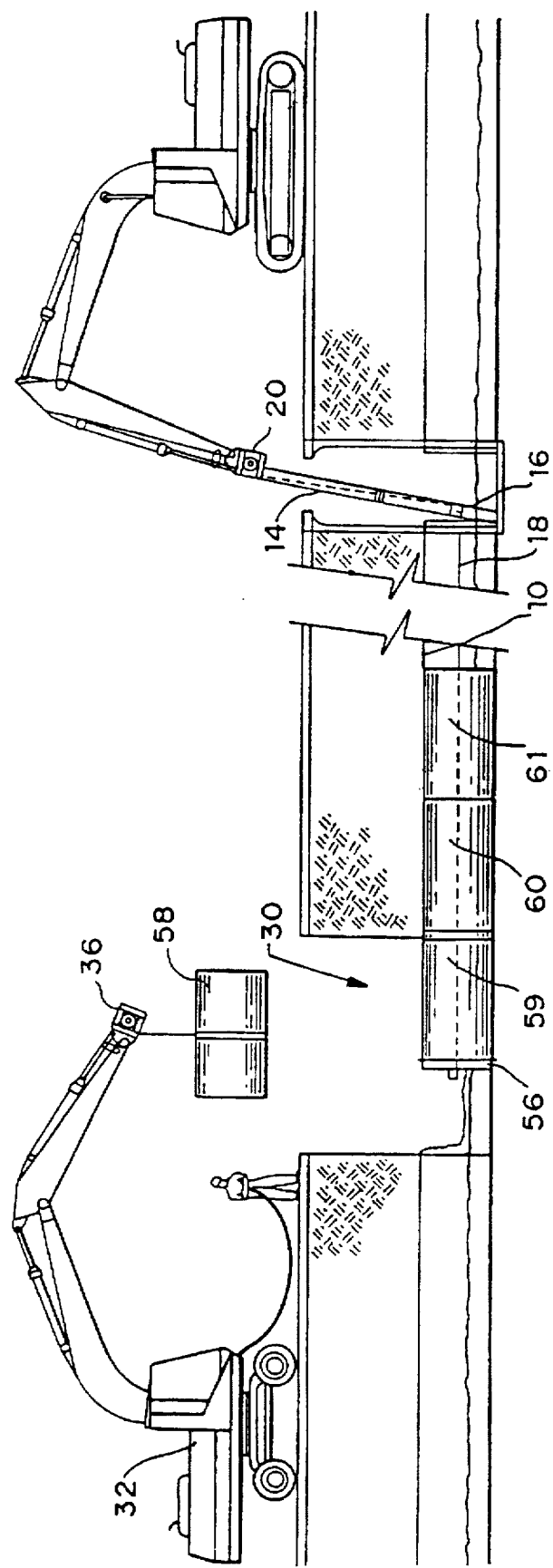
FIG. 3 is schematic depiction of the sewer rehabilitation system during the host pipe lining process.

FIG. 3 illustrates the lining process using the system of the present invention. The same equipment as shown in FIGS. 1 and 2 is used to place the liner pipe in position, and in addition a pulling mandrel 56 is employed. As shown in FIG. 3, cable 18 is positioned in the central area of host pipe 10 by guide roller 16 is threaded through the host pipe to the second access area. Pipe liner sections 58, 59, 60 and 61 are shown in FIG. 3 during a lining process. The process in initiated by passing cable 18 through a first section of pipe liner (as shown in FIG. 3 pipe liner section 61) and secured to pulling mandrel 56. This process occurs in the excavated access area 30. Winch 20 pulls cable 18 approximately the length of the section of pipe liner so that the pipe liner is drawn into host pipe 10. As shown in FIG. 3 section 61 was the first section of pipe liner drawn into the host pipe. Pulling mandrel 56 is unfastened from the cable and a second section of pipe liner (pipe liner section 60 as shown in FIG. 3) is lowered into the second access area by the boom on host vehicle 32 and winch 36. The second section of pipe liner 60 is abutted to the first section of pipe liner 61 and cable 18 is pulled therethrough and secured to test mandrel 56. Winch 20 spools cable 18 pulling the first and second lengths of pipe liner so than section 60 is pulled into the host pipe and section 61 travels further into the host pipe. The process is repeated until the section of host pipe is lined.

As shown in FIG. 3 the lining process can be carried on simultaneously while another section of liner pipe 58 is positioned into the access area. Also in FIG. 3 the host vehicle 32 is shown with an operator using a remote control to manipulate the winch and boom while the lowering the pipe liner into the access area 30.

Figure 11:
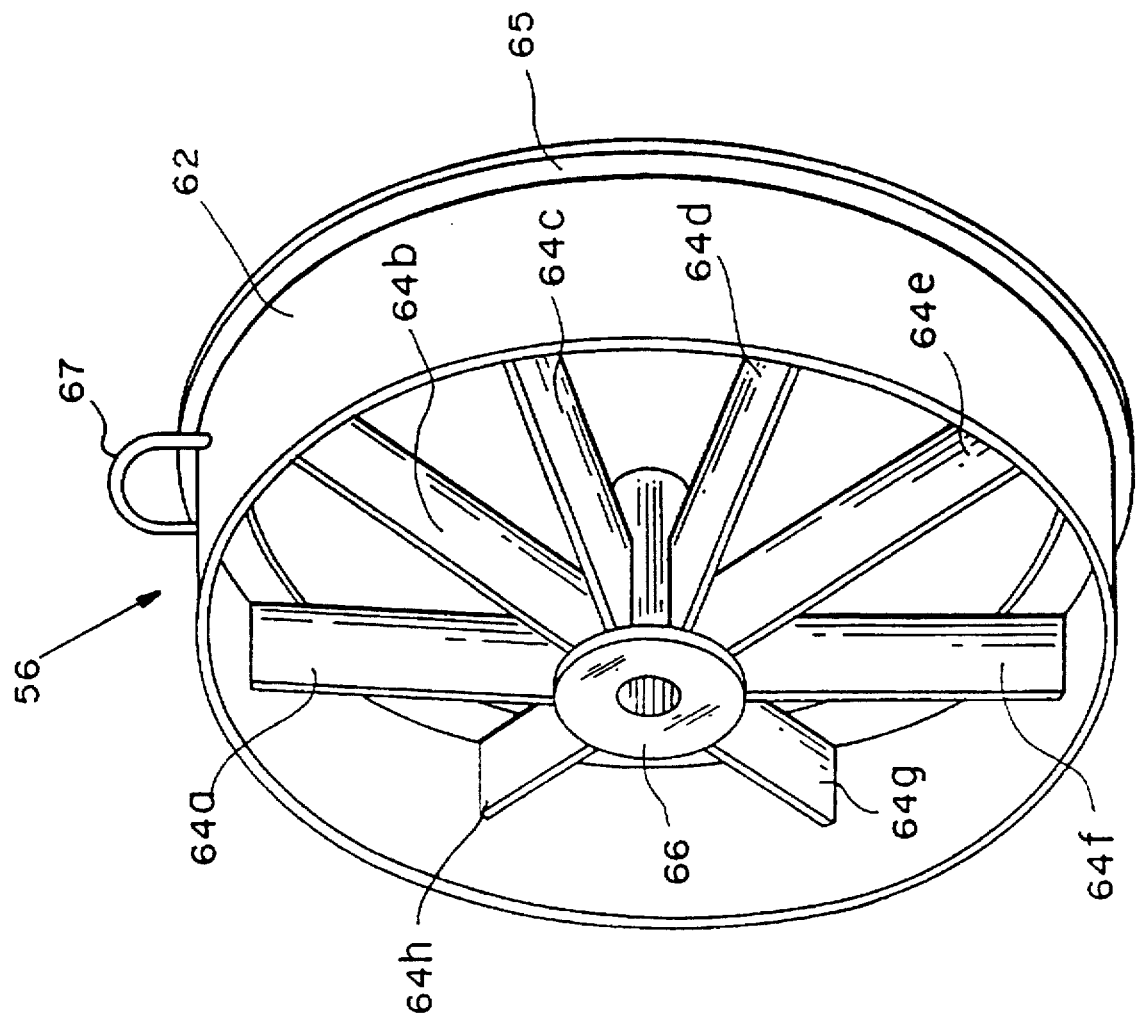
FIG. 11 is a perspective view of the pulling mandrel.
Figure 12:
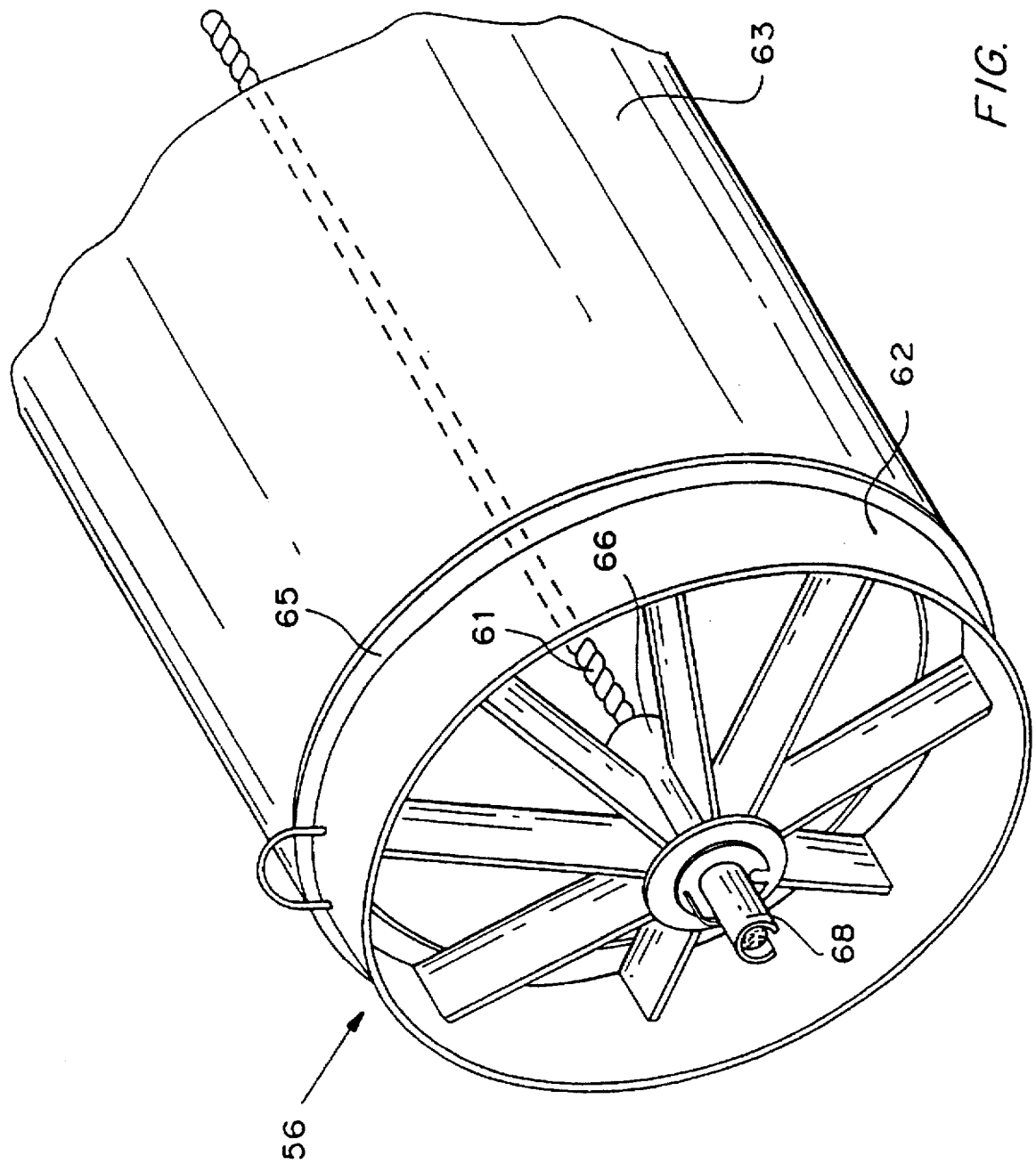
FIG. 12 is a perspective view of the pulling mandrel and direction of pipe liner.
Figure 13:
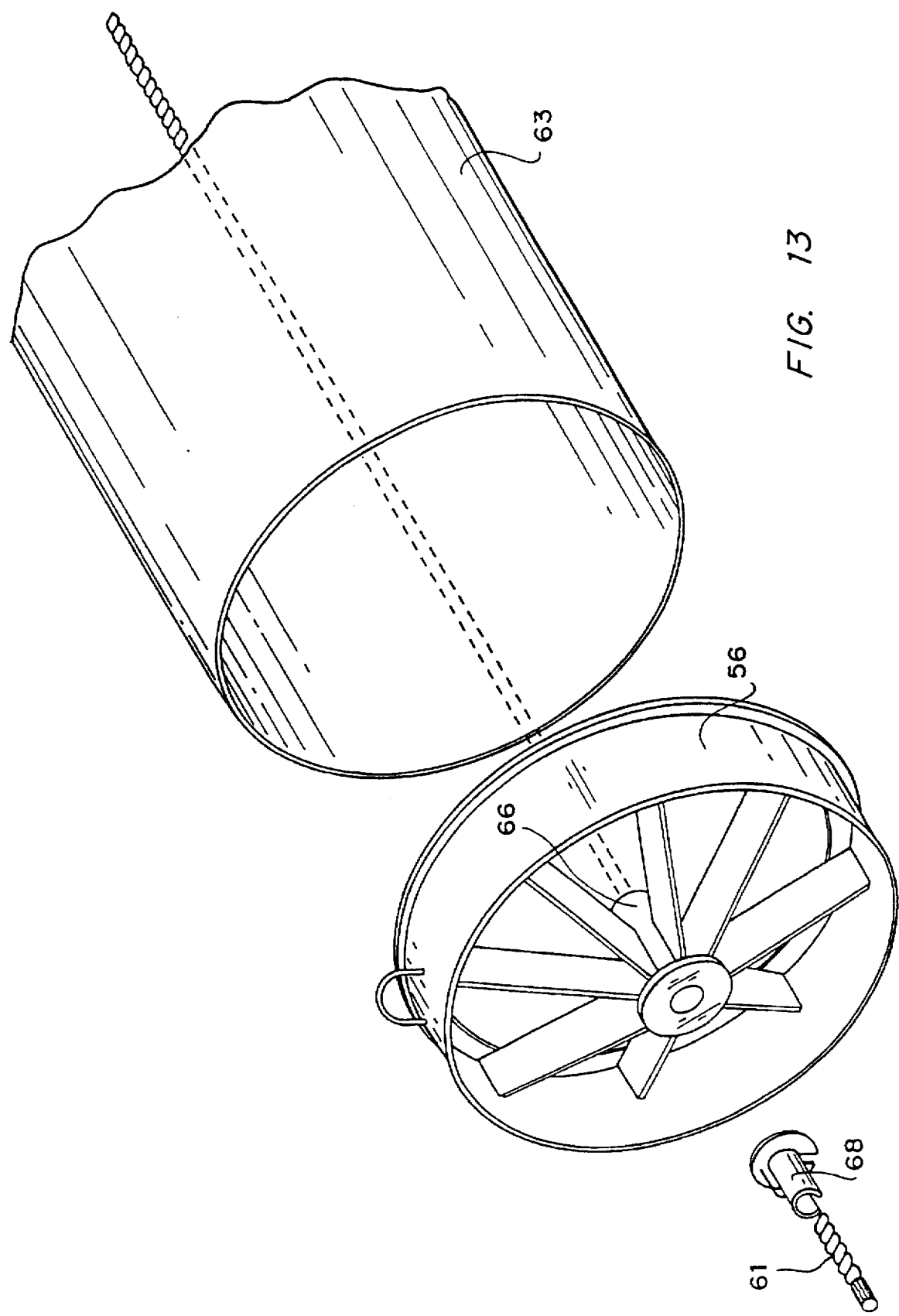
FIG. 13 is an exploded view of the pulling mandrel with the locking teacup, cable and pipe liner.
Figure 14:
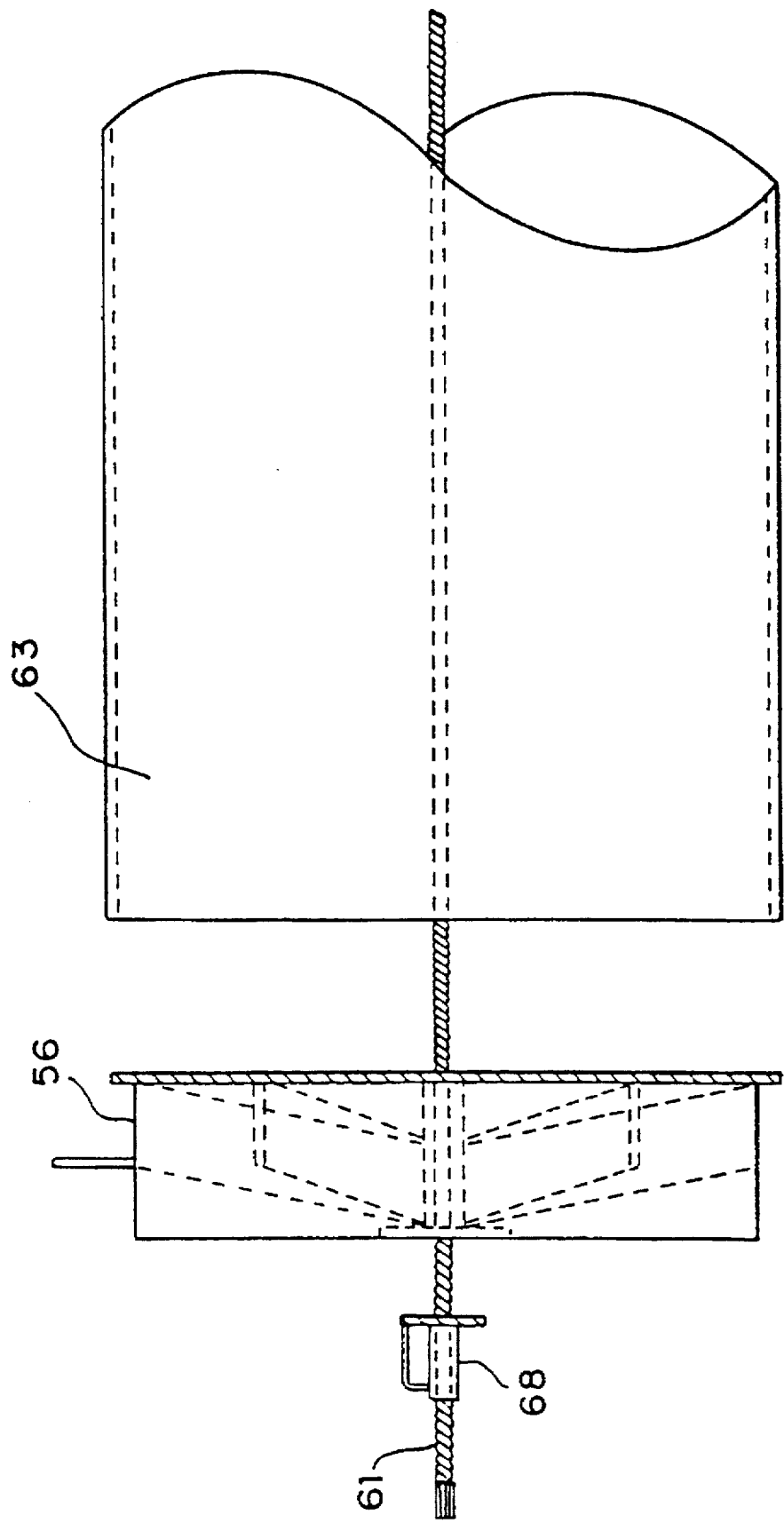
FIG. 14 is a side view of the exploded depiction of the locking teacup, pulling mandrel, pipe liner and cable.

The system of this invention uses a pulling mandrel shown in more detail in FIG. 11. The pulling mandrel 56 has a circular member 62 with the flange 65 which is sized to be received in the host pipe and flange 65 contacts the circumference of the pipe liner. A plurality of spokes converge to a central hub 66. The spokes are designated with reference numerals 64a through 64h. Hub 66 has a circular opening which is sized to accompany a cable passing therethrough. The pulling mandrel allows for flow through the spokes. Also, the pulling mandrel distributes the pulling load evenly on the pipe liner. In FIG. 11 a hook 67 is shown which is used for attachment to a cable for lowering the test mandrel into the access areas when necessary. FIG. 12 shows the pulling mandrel 56 contacting a section of pipe liner 63 and illustrates the detail of the cable 61 passing through hub 66. The end of the cable 61 is secured with attachment 68 known as a teacup. Any attachment that securely fastens the cable to the hub of the pulling mandrel may be used. FIGS. 13 and 14 are exploded views showing the teacup 68, pulling mandrel 56 and section of pipe liner 63 and cable 61.

Figure 4:
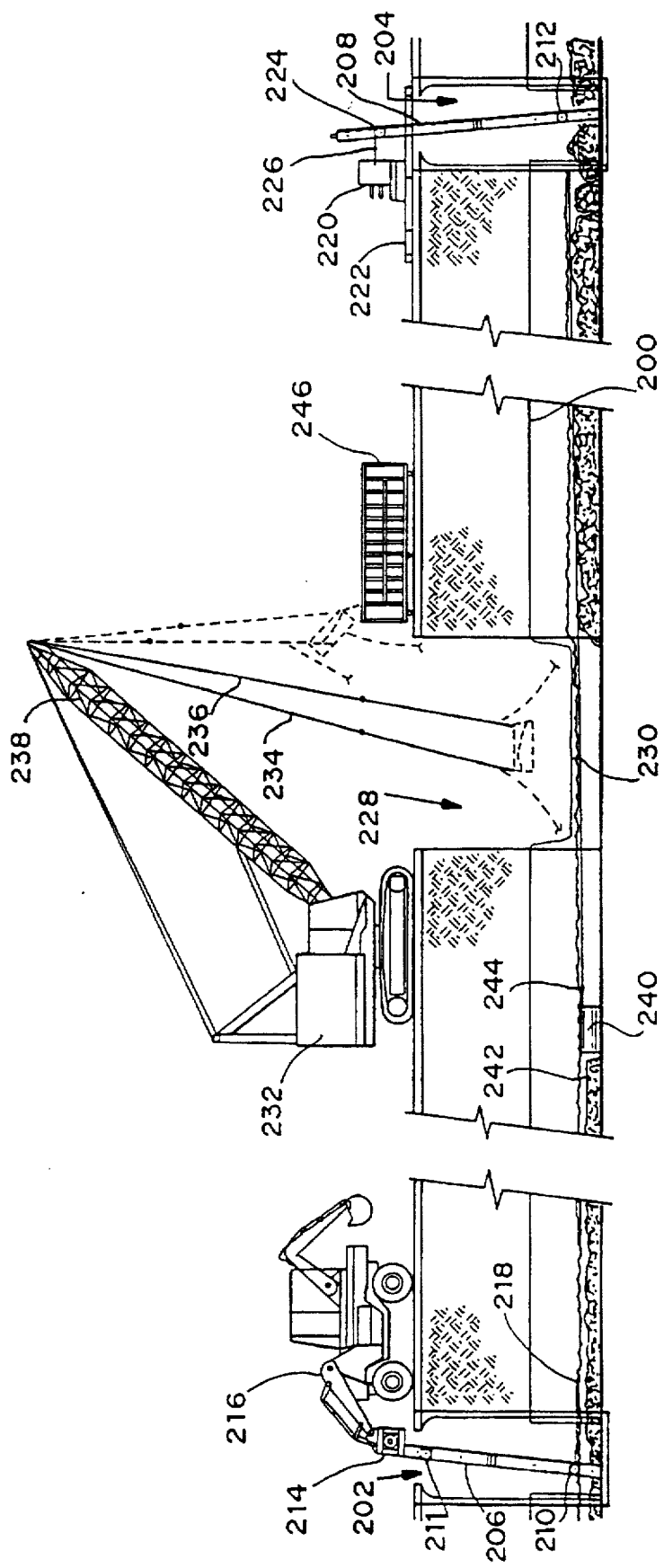
FIG. 4 is a schematic depiction of an alternative embodiment of the sewer rehabilitation system showing the cleaning process of the sewer line.

FIG. 4 is an alternative method for slip lining a host pipe that can also be performed while a sewer is in service. The alternate method can be used for remote or difficult to access areas. The alternate method uses some of the same components illustrated in the system previously described. The host pipe 200 to be cleaned is selected and access areas that will be used for the rehabilitation process are also selected. As shown in FIG. 4 two access areas at either end of the host pipe 200 are access shafts 202 and 204 which can be existing manholes. The manholes can be located in confined areas such as residential property. Down hole booms 206 and 208 are positioned vertically in the access shafts 202 and 204 respectively. Each of the down hole booms shown in FIG. 4 has at least one guide roller positioned on the end of the boom that extends above the access shaft. In the preferred embodiment, guide rollers are adjustable along the length of the down hole boom so that guide rollers can be moved on the down hole boom to position a cable in the access shaft and into the host pipe. In FIG. 4 guide rollers 210 and 212 are shown positioned on down hole booms 206 and 208 respectively.

FIG. 4 shows different types of winch placements. In access shaft 202 the winch 214 is mounted on down hole boom 206 and also mounted to a mobile vehicle 216. Cable 218 extends from winch 214 along down hole boom 206 into host pipe 200. Cable 218 passes around guide roller 210 so that it is aligned to enter the host pipe. In FIG. 4 the winch 214 is mounted on the mobile vehicle and winch 214 can serve as a positioning means to guide the cable 218 along the down hole boom 206. Another guide roller 211 which is optional is also shown on down hole boom 206.

Also shown in FIG. 4 is skid mounted winch 220. A platform or skid 222 is set up at the access shaft 204 and the winch is secured and mounted to the platform 222. When using a skid mounted winch it is preferred that the down hole boom have guide roller 224 on down hole boom 208 to guide cable 226 from winch 220 on down hole boom 208. As shown in FIG. 4, cable 226 passes around guide roller 212 to align cable 226 to enter the host pipe 200.

An excavation 228 provides an intermediate access area 228 to the host pipe 200. As shown in FIG. 4, a portion of the host pipe 200 is removed to approximately the spring line 230. Hoist 232, which may be a conventional crane, is positioned adjacent to the intermediate access area 228. The hoist has at least one cable that can be lowered into the access area. In the preferred embodiment the hoist has two cables 234 and 236 that are operated in conjunction with crane 238.

In the cleaning operation shown in FIG. 4, a cleaning bucket 240 is used essentially in the same manner as described and illustrated previously in FIGS. 1, 7, 8, 9, 10a, 10b and 10c. Cables 218 and 230 are attached to yokes 242 and 244. The cables are spooled and released by the respective winches 214 and 220 so that the bucket collects debris from both sections of the pipe extending from the intermediate access area to access shafts 202 and 204. In the alternate method, cleaning bucket 240 with trapped debris is pulled to the intermediate access area 228. Hoist cables 234 and 236 are attached to yokes 242 and 244 on the cleaning bucket. The hoist raises the cleaning bucket withdrawing it from the host pipe to the surface at the intermediate access area and further raises and tips the cleaning bucket by manipulating cables 234 and 236 to discharge the accumulated debris into collection bin 246. It is not necessary to unfasten cables 218 and 226 because the cable winches can be released out to provide enough slack. The cleaning bucket 240 is lowered into the intermediate access area 228 by hoist 232. The cleaning bucket is then drug through the debris filled host pipe in the same manner of operation as previously described to complete the cleaning of one section of the host pipe between the intermediate access area and one of the access shafts. To clean both sections of the pipe extending from the intermediate access area, it is necessary to reverse the leading edge of cleaning bucket 240 to provide for debris entrapment as previously discussed.

Figure 5:
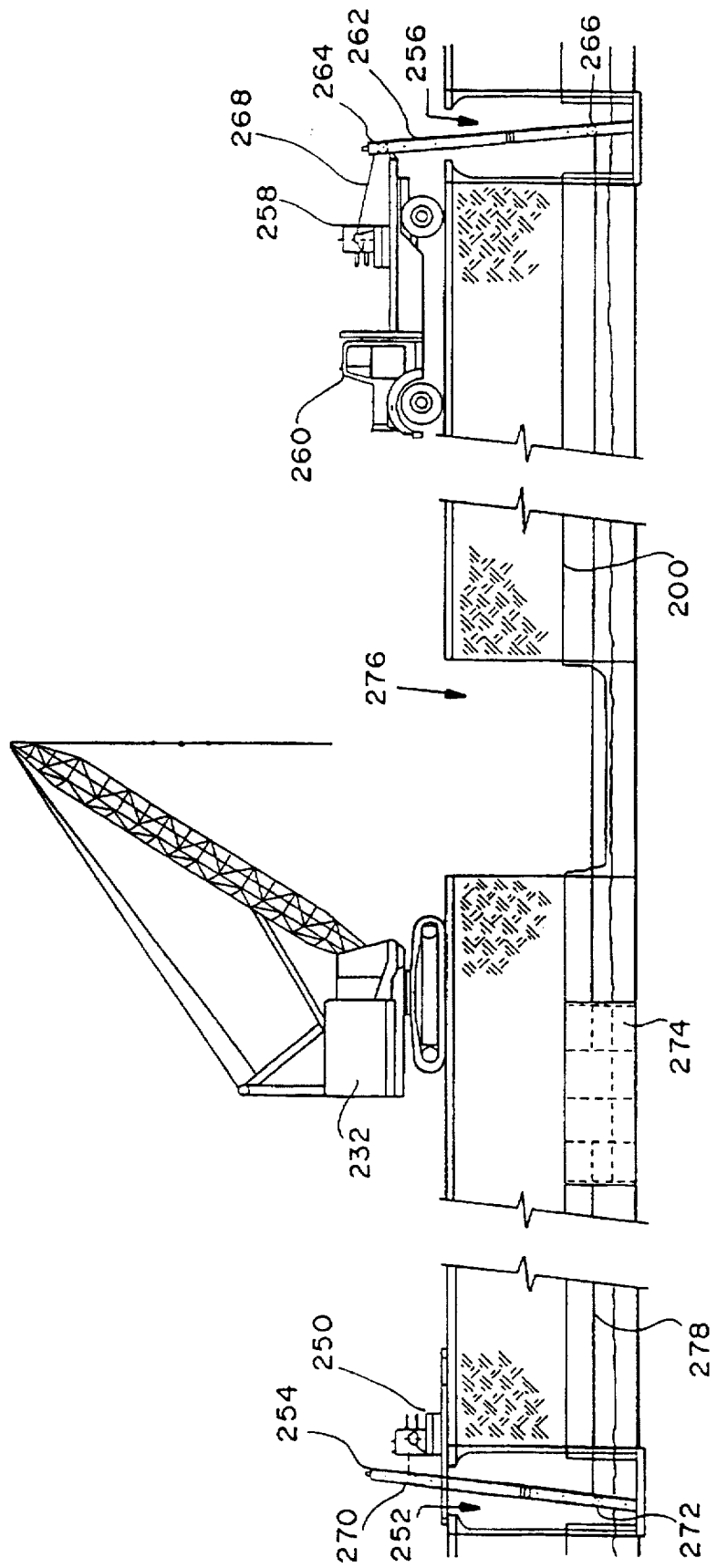
FIG. 5 is a alternative embodiment of a sewer rehabilitation system showing the testing of the sewer line.

FIG. 5 illustrates an alterative method for testing a host pipe. The access area arrangement is similar to that in FIG. 4 which accesses host pipe 200. A skid mounted winch 250 is placed adjacent to access shaft 252 with down hole boom 254. The down hole boom skid mounted winch arrangement is previously discussed in describing FIG. 4. Access shaft 256 is serviced by winch 258 that is mounted on the bed of truck 260. Down hole boom 262 has guide rollers 264 and 266. The cable 268 from winch 258 goes around the top of guide roller 264 which is placed near the top of down hole boom 262. Guide roller 264 serves as a guide for the cable 268 to travel along down hole boom 254 into access shaft 256. Then cable 268 goes around guide roller 266 into host pipe 200. In the preferred method, guide rollers 264 and 266 are adjustably mounted along the length of the down hole boom so that they may be positioned as needed to guide the cable smoothly from the winch and into the host pipe.

Similar guide rollers 270 and 272 are shown on the down hole boom associated with the skid mounted winch.

FIG. 5 shows the test mandrel 274 in host pipe 200 during the testing process. The test mandrel 274 is lowered into the intermediate access area 276 by hoist 232. The test mandrel 274 has been described in these discussions of the invention. Cable 278 from the skid mounted winch is attached to test mandrel 274 at the point of attachment on one end of the test mandrel while the test mandrel 274 is in the intermediate access area. Cable 278 is attached to the opposite end of test mandrel 274 while the test mandrel is in the intermediate access area. The test mandrel 274 is sized to fit inside the host pipe and pulled through the host pipe to be tested for obstructions. In addition, the test mandrel used can be described previously in FIGS. 15 and 16 also provides an additional final sweep to collect mineralized deposits or residual debris. The test mandrel 74 is pulled through the test pipe by alternatively spooling the skid mounted winch 250 and the truck mounted winch 258 through the host pipe 200. The test procedure is completed. The test mandrel is removed from host pipe 200 using hoist 232.

Figure 6:
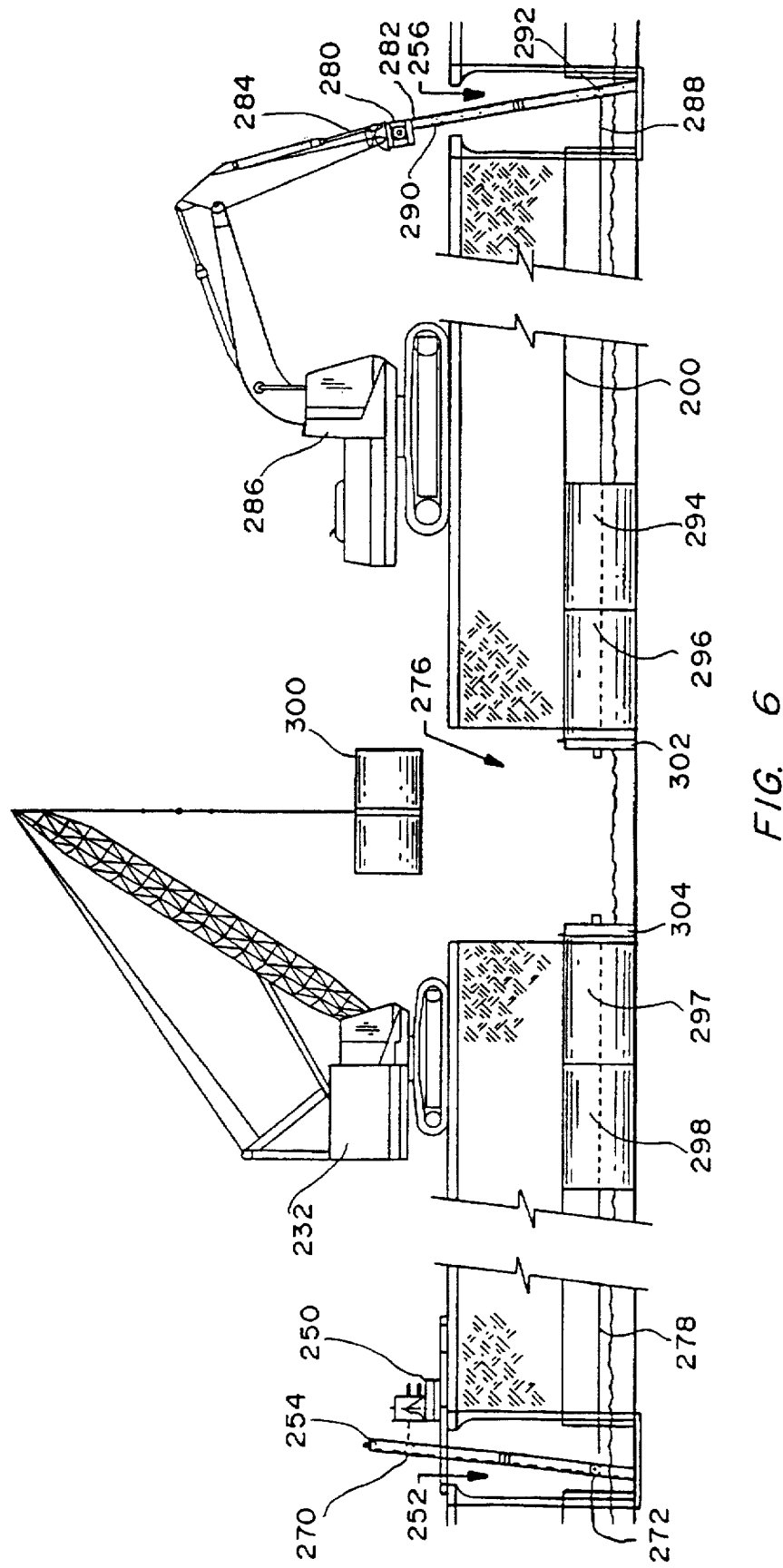
FIG. 6 is a schematic depiction of an alternate system showing the host-pipe lining operation.

FIG. 6 illustrates the slip lining process of the alternative method. In FIG. 6 the host pipe 200 is accessed at intermediate access area 276. The skid mounted winch 250 is placed in the same position as shown in FIG. 5. Down hole boom 254 is placed in access area 252. Skid mounted winch 255 drives cable 278 into the host pipe using down hole boom 254 and guide rollers 270 and 272 assisting in positioning cable 278. In access area 256 the winch mounted on the truck bed has been replaced by a winch 280 mounted to a down hole boom 282 and also mounted to the stick of boom 284 of excavator 286.

As can be seen from FIGS. 4, 5 and 6, the down hole boom mounts into the access shafts can utilize any type of mounting vehicle or skid placement which will secure a down hole boom vertically in an access shaft. Winch 280 serves as a guide for cable 288 along the down hole boom. Although guide roller 290 is shown, it is optional as previously described. Guide roller 292 at the bottom of down hole boom 282 aligns the cable into host pipe 200. As previously discussed, the guide rollers are adjustable to provide proper alignment of the cable down the access shaft and into the host pipe.

FIGS. 19 and 20 are details of the down hole booms used with alternate method and system shown in FIG. 4, 5 and 6. In FIG. 19 down hole boom 350 is shown with hook 352 fixed to top plate 364 with attachment pins 386a, 386b, 386c and 386d. The top plate 364 is attached to corner pieces 383 and 384 through which pins 386a, 386b, 386c and 386d extend to C-beams 388 and 390. The C-beams are positioned facing each other with spacing to accommodate guide rollers in between, as shown in FIG. 19 which is provided for ease in transport and set up. Adjustable guide roller 354 is disposed in between C-beams 388 and 390. At the end of the C-beams is bottom plate as shown on C-beam 388 extending from the corners of the C-beam. Joinder pins 396 and 398 extend through openings in the bottom plate 388 through top plate 390 of C-beam 400 which abuts C-beam 366. C-beam 402 faces C-beam 400. Adjustable guide roller 356 is disposed between C-beams 400 and 402. C-beam 400 has end plate 394 provided for joinder to additional C-beams. C-beam 402 has top plate 392 and a bottom plate (not shown) for joinder to adjacent C-beams as described above. A series of straps 370, 372, 374, 376, 378 and 380 are welded to the outside corners of the C-beams and provide spacing for the C-beams of the guide rollers. The guide rollers are adjustable as previously discussed to align the cable 358 from a mounted winch such as a skid or truck mounted winch the down hole boom into the host pipe (not shown). The guide rollers are adjustable by removing pins 360 and 362 and repositioning the guide rollers with other pins of the down hole boom as discussed above for FIG. 21.

FIG. 20 is the same embodiment as FIG. 19 except cable 358 is placed on guide rollers 354 and 356 to illustrate how the guide rollers can be used to re-orient the direction of the cable if necessary. The cable 358 can be fed to the same or opposite direction from the winch feed depending on the side of guide roller 356 the cable is wrapped.

Hoist 232 is positioned at intermediate access area 276. During the lining process hoist 232 lowers sections of pipe liner into the intermediate access area. Cables 278 and 288 pass through the host pipe to the intermediate access area. The cable is then passed through a section of pipe liner that has been lowered into the intermediate access area and the cable is further threaded through a pulling mandrel and secured. This general process has been described previously for the system of this invention.

FIG. 6 illustrates the simultaneous lining process for the sections of host pipe extending from the intermediate access area 276. If desired the lining operation could be performed on one section of the host extending from the intermediate area to an access shaft and then the other section. In FIG. 6 pipe liner sections 294, 296, 297 and 298 have been inserted into the host pipe 200.

For example, pipe liner 296 was lowered into the access area 276 and placed adjacent to section 294 which had been inserted into host pipe 200. The cable 288 was passed through both pipe liner sections 294 and 296 and secured to pulling mandrel 302. Winch 280 was spooled to pull pipe liners 294 and 296 into host pipe 200. The same operation was performed with pulling mandrel 302 and pipe liner 294.

When each section of pipe liner has been pulled into the host pipe approximately the length of the liner section another section of pipe liner is introduced into access area 272. The pulling mandrel is removed from the cable and the new section of liner pipe is placed into the mouth of the host pipe, the cable is drawn through the additional section of liner pipe and secured to the test mandrel. In the direction of access shaft 252 pulling mandrel 304 secured to cable 278 pulls pipe liner section 298 and 297 into host pipe 200. The operation of the pulling mandrel has been previously discussed and the pulling mandrel is shown in FIGS. 11, 12, 13 and 14.

The description provided herein is not intended to cover all the embodiments and methods of the claimed invention. Other variations will be understandable to those skilled in the art.

What is claimed is:

1. A method for using a system for lining pipe comprising the steps of (a) selecting a length of host pipe for lining;

(b) accessing the host pipe on both ends of a selected length of the host pipe for lining;

(c) positioning a down hole boom vertically in a shaft that accesses one end of the host pipe that has a first winch and a cable guide mounted thereon whereby the first winch drives a first cable down the shaft into the host pipe over the cable guide that positions the first cable into the host pipe;

(d) mounting a second winch with a second cable on a movable mount positioned at an access area at the host pipe opposite to the end where the down hole boom is located sufficient to accommodate a length of pipe liner and the second winch capable of movement from the surface to the host pipe;

(e) passing the first cable from the first winch mounted on the down hole boom over the cable guide through the length of the host pipe;

(f) further passing the cable through a length of liner pipe sized to line the inside of the host pipe which has been lowered into the access area next to the mouth of the host pipe using the second winch on the movable mount;

(g) further threading the first cable through a circular pulling mandrel with a central opening in a hub that has spokes extending therefrom to a circular outer ring;

(h) securing the first cable to the pulling mandrel so that upon spooling the first winch the pulling mandrel contacts the circular end surface of the pipe liner;

(i) pulling the pipe liner and pulling mandrel with the first cable and first winch through a length of the host pipe approximately the length of the pipe liner;

(j) releasing the first cable from the pulling mandrel and removing the pulling mandrel;

(k) lowering a second length of pipe liner into the access area adjacent to the first length of pipe liner with the second winch and a second cable;

(l) placing the pulling mandrel adjacent to the second length of pipe liner;

(m) securing the first cable to the pulling mandrel so that upon spooling the first winch the pulling mandrel contacts the circular end surface of the second length of pipe liner;

(n) pulling the pipe liner and pulling mandrel with first cable and first winch through a length of the host pipe approximately the length of the second pipe liner length; and (o) repeating steps (k) through (n) until the length of host pipe is lined.

2. A method for using a system for lining pipe of claim 1 additionally comprising the step of cleaning the host pipe prior to step (c).

3. A method for using a system for lining pipe of claim 1 wherein step (d) the second winch on the movable mount is placed on the boom of a mobile host vehicle.

4. A method for using a system for lining pipe of claim 3 wherein the mobile host vehicle is an excavator and wherein the winch is attached to a movable mount at the point of attachment of the back hoe excavation bucket.

5. A method for lining pipe comprising the steps of (a) selecting the length of host pipe for testing and relining;

(b) accessing the host pipe on both ends of a selected length of the host pipe to be tested and relined by access shafts;

(c) accessing the host pipe at an intermediate point between the two ends of the selected length;

(d) removing a length of host pipe at the intermediate access area of sufficient length to accommodate the length of a pipe liner section in the access area adjacent the host pipe;

(e) positioning vertically two down hole booms in the access shafts that extend above the surface at both ends of the host pipe, the down hole booms having at least one cable guide mounted thereon;

(f) placing a first and second winch at both ends of the selected length of host pipe on the surface adjacent to both the access shafts and the end of the down hole booms extending above the access shaft;

(g) threading cables from the first and second winches into the access shafts over the cable guide on the down hole booms and through the host pipe so the cables can be driven smoothly in the access shaft and the host pipe;

(h) placing a hoist on the surface at the intermediate access area of the host pipe;

(i) lowering a length of pipe liner sized to reline the inside of the host pipe with the hoist at the intermediate access area;

(j) extending the cable on the first winch over the down hole boom through the host pipe into the intermediate access area;

(k) further passing the cable on the first winch through the length of the pipe liner lowered into the intermediate access area;

(l) further threading the cable from the first winch through a pulling mandrel with a central opening that has spokes extending therefrom to a circular outer ring thereby allowing fluid from the host pipe to flow through in between the spokes;

(m) securing the cable from the first winch to the pulling mandrel so that upon spooling the first winch the pulling mandrel contacts the circular end surface of the pipe liner;

(n) pulling the pipe liner and pulling mandrel with the cable by the first winch through a length of host pipe approximately the length of the of the pipe liner;

(o) releasing the cable from the pulling mandrel and removing the pulling mandrel;

(p) lowering a second length of pipe liner into the intermediate access area adjacent to the first length of pipe liner;

(q) placing the pulling mandrel adjacent to the second length of pipe liner;

(r) securing the cable from the first winch to the pulling mandrel so that upon spooling the first winch the pulling mandrel contacts the circular end surface of the second length of pipe liner;

(t) pulling the pipe liner and pulling mandrel with the cable by the first winch approximately the length of the second pipe liner;

(u) repeating steps (o) through (t) until the length of the host pipe between the intermediate access area and the access area serviced by the first winch is relined; and (v) repeating steps (i) through (u) using the second winch to reline the host pipe extending from the intermediate access area to the access shaft serviced by the second winch.

6. A method of claim 5 wherein at least one of the first or second winches is skid mounted.

7. A method of claim 5 wherein at least one of the first or second winch is mounted on a mobile vehicle.

8. A method of claim 5 wherein the hoist is a mobile crane.

* * * * *